(12) United States Patent
Johnson et al.

(10) Patent No.: US 7,024,590 B2
(45) Date of Patent: Apr. 4, 2006

(54) DIGITAL LOOP DIAGNOSTIC PORT CONTROL MONITOR

(75) Inventors: Bruce E. Johnson, Costa Mesa, CA (US); Thomas J. Hammond-Doel, Costa Mesa, CA (US); Donna M. Jollay, Costa Mesa, CA (US); Michael I. Thompson, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 159 days.

(21) Appl. No.: 10/886,966

(22) Filed: Jul. 7, 2004

(65) Prior Publication Data

US 2004/0264365 A1   Dec. 30, 2004

Related U.S. Application Data

(62) Division of application No. 09/436,620, filed on Nov. 9, 1999.
(60) Provisional application No. 60/108,471, filed on Nov. 14, 1998.

(51) Int. Cl.
G06F 11/00 (2006.01)

(52) U.S. Cl. .................... 714/39; 714/51; 370/242; 370/251

(58) Field of Classification Search ............ 714/39, 714/47, 100, 25, 27, 30, 43, 48, 51; 370/241, 370/242, 246, 248, 251, 252, 463
See application file for complete search history.

(56) References Cited

U.S. PATENT DOCUMENTS

| | | | |
|---|---|---|---|
| 5,361,250 A | | 11/1994 | Nguyen et al. |
| 5,390,188 A | | 2/1995 | Dawson |
| 5,436,624 A | * | 7/1995 | Pearce et al. ............ 340/3.9 |
| 5,619,497 A | | 4/1997 | Gallagher et al. |
| 5,751,715 A | | 5/1998 | Chan et al. |
| 6,005,696 A | * | 12/1999 | Joline et al. ............. 398/25 |
| 6,038,235 A | | 3/2000 | Ho et al. |
| 6,038,618 A | * | 3/2000 | Beer et al. ............... 710/18 |
| 6,081,847 A | | 6/2000 | Lin |
| 6,101,166 A | * | 8/2000 | Baldwin et al. .......... 370/222 |
| 6,118,776 A | | 9/2000 | Berman |
| 6,188,668 B1 | * | 2/2001 | Brewer et al. ........... 370/222 |
| 6,233,236 B1 | | 5/2001 | Nelson et al. |

FOREIGN PATENT DOCUMENTS

| | | |
|---|---|---|
| EP | 0727895 A3 | 8/1996 |
| EP | 0727895 A2 | 8/1996 |
| WO | WO 98/36537 | 8/1998 |
| WO | WO 99/57854 | 11/1999 |

* cited by examiner

Primary Examiner—Hassan Kizou
Assistant Examiner—Dmitry Levitan
(74) Attorney, Agent, or Firm—Morrison & Foerster LLP

(57) ABSTRACT

Methods and associated hub arrangements are described for use in diagnosis and recovery in high performance digital loops such as, for example, those seen in Fiber Channel systems. In one system having a hub configured for interconnection of a plurality of stations as part of a digital system such that digital data flows between the stations based on operational status of the system, an arrangement forms part of the hub which arrangement is connectable at points within the hub and between at least two different pairs of the stations for monitoring certain characteristics of the data in a way which provides for non-invasive identification of one or more conditions related to the operational status of the system.

29 Claims, 22 Drawing Sheets

"No Valid Data"
Indication

Merlin Management Card Status Screen

| | | | |
|---|---|---|---|
| Serial #: | 02-00197-0002 | Active: | Yes |
| HW Revision: | 01.01 | SW Revision: | 01.01 |
| Location: | Bldg 54 | Name: | Merlin1 |
| IP Address: | 24.34.233.148 | MAC Address: | 080009123456 |
| Priority: | Z | Force Active | |
| | | Mgmt Password: | ****** |

DIGITAL LOOP DIAGNOSTIC PORT CONTROL MONITOR

CROSS-REFERENCE TO RELATED APPLICATION

This application is a division of application Ser. No. 09/436,620 filed on Nov. 9, 1999, which application is specifically incorporated herein, in its entirety, by reference.

BACKGROUND OF THE INVENTION

The present invention relates generally to the field of digital loop technology utilizing a hub structure and, more particularly, to the field of diagnosis and recovery using a hub in high performance digital loops such as, for example, those hubs seen in Fibre Channel systems.

The value of the digital loop in high performance systems such as Fibre Channel is without question. Moreover, the use of such a loop has proven to be enhanced through the use of a hub which serves as a central connection point for the loop. In such a configuration, the loop is said to be in the form of a "star". Initial development of hubs saw what may be referred to as an unmanaged or "dumb" hub. As these terms indicate, such hubs served much in the manner of a patch panel, devoid of any monitoring capability as to the data passing through the hub.

Still considering the hub technology of the prior art, attention is now directed to FIG. 1 which illustrates a more recent digital system generally indicated by the reference numeral 10. System 10 includes a Fibre Channel hub 12 serving to interconnect a loop 14 including a plurality of stations S1–S4. System 10 further includes a local area network (LAN) 16 having independent connections 17*a* and 17*b* with stations S1 and S2, respectively. LAN 16 further includes a station S5 as well as a work station (WS) 18. Unlike the earlier generation of hubs described above, hub 12 includes limited diagnostic capabilities. These capabilities have generally been limited to high level observation of the data traveling around the loop. More specifically, these prior art diagnostic capabilities may indicate that certain packets of data are corrupted in addition to indicating the point of origination of the corrupted data. At first blush, this may seem to be extremely useful information for purposes of diagnosis. One must remember, however, that the corrupted data may have traveled through a substantial number of stations between it's point of origin and it's destination. For example, data originating from S2 and destined for S1 on the loop must intermediately pass through stations S3 and S4. Therefore, it is possible for the data to have been corrupted at any point along this path. An unsuspecting system administrator who immediately assumes that S2 is responsible for the corrupted data can waste enormous effort in attempting to diagnose a problem which may occur anywhere along the loop between S2 and S1.

Still referring to FIG. 1, in attempting to perform a detailed diagnosis, a technician may utilize a logic or protocol analyzer 20. S2 and hub 12 are originally connected using cable 22. The analyzer may be connected by disconnecting the original cable 22 at one end and then reconnecting the disconnected end to the analyzer such that original cable 22 is represented as a dashed line indicated by the reference number 22*a* and an additional cable 24 is used to connect the analyzer with S2. Assuming the problem is not being caused by S2, the technician has little hope of resolving the problem using the analyzer as depicted. Thus, the use of an analyzer in such a scenario is disadvantageous. Moreover, as another disadvantage, it is important to note that the use of the analyzer is intrusive. That is, connection of the analyzer itself modifies the structure of the loop. This fact can cause severe complications in some cases. For example, if the problem is being caused by a loose connector (not shown) at S3, connection of the analyzer may make the problem disappear if the output signal of the analyzer is greater than the output signal of S2 whereby to overcome attenuation being caused by the loose connector at S3. In this scenario, a reasonable technician may assume that the problem has somehow corrected itself, since the analyzer will indicate that there are no errors. Unfortunately, however, as soon as the original connections are restored, the masked problem will return. The technician is then likely to remain suspicious of S2, replacing it and its associated connections and is also likely to suspect fiber 22. As can be appreciated, this disadvantageous hit or miss technique is likely to be a long process. Moreover, each time a connection is disturbed to insert the analyzer, the loop is taken out of service. The process can also be expensive just due to replacement of any number of perfectly good, but suspect components.

Continuing to consider the use of an analyzer, it should also be appreciated that analyzer diagnosis is further complicated by the fact that the analyzer is generally configured to monitor only one or two points. This is an important consideration since the loop, unlike LAN 16, is not a broadcast medium. That is, the data present between different pairs of stations on loop 14 is itself different since the stations themselves insert and remove data from the loop. Just through the use of an analyzer, it is very difficult to gain a complete "picture" of what is going on in the loop which may, in fact, represent the only way in which a particular problem may be understood. Not only is the analyzer ineffective in many cases, it is also typically expensive. It is not uncommon for a Fibre Channel analyzer to cost $45,000.

The present invention provides a highly advantageous arrangement and associated method which resolves the foregoing disadvantages and difficulties while providing still further advantages, as will be seen hereinafter.

SUMMARY OF THE INVENTION

As will be described in more detail hereinafter, there are disclosed herein methods and associated hub arrangements for use in diagnosis and recovery in high performance digital loops such as, for example, those seen in Fibre Channel systems. Accordingly, within a hub configured for interconnection of a plurality of stations as part of a digital system such that digital data flows between the stations based on operational status of the system, an arrangement forms part of the hub which arrangement is connectable at points within the hub and between at least two different pairs of the stations for monitoring certain characteristics of the data in a way which provides for non-invasive identification of one or more conditions related to the operational status of the system.

In one aspect of the invention, recovery from a condition which is adverse to the operation of the system is initiated based on identification of the adverse condition.

BRIEF DESCRIPTION OF THE DRAWINGS

The present invention may be understood by reference to the following detailed description taken in conjunction with the drawings briefly described below.

FIG. 28 illustrates the display of a management view.

DETAILED DESCRIPTION OF THE INVENTION

Figure 2:
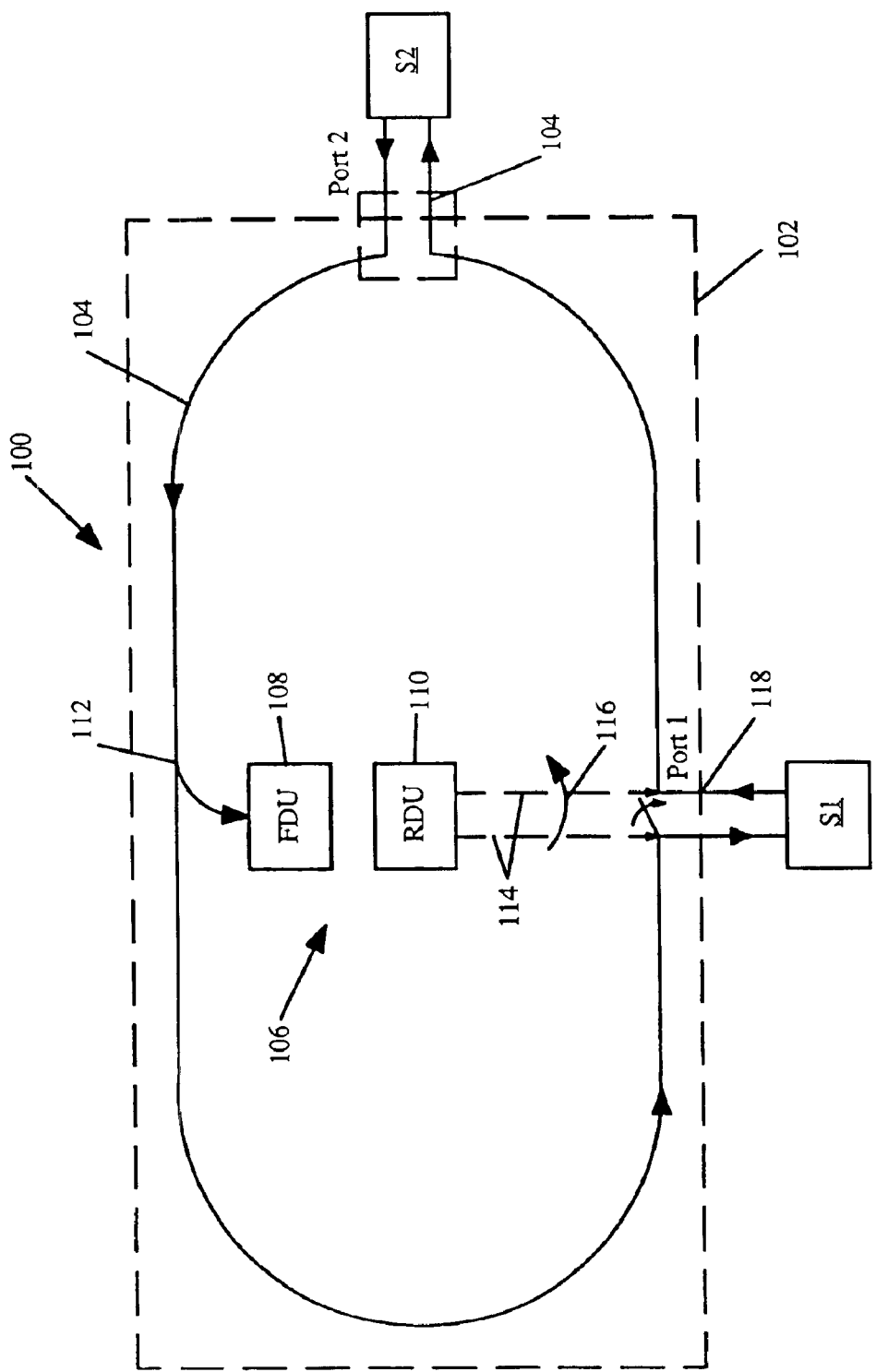
FIG. 2 is a diagrammatic block diagram of a digital system in the form of a loop which is defined using a hub manufactured in accordance with the present invention in an implementation which utilizes a fixed diagnostic unit and a roving diagnostic unit.

Attention is immediately directed to FIG. 2 which illustrates a digital system generally indicated by the reference numeral 100 including a hub 102 which is manufactured in accordance with the present invention. It is noted that like reference numbers are used throughout the various figures to refer to like components wherever possible. System 100 includes a main loop 104 which uses Fibre Channel protocol. However, it should be appreciated that loops which employ other protocols such as, for example, Token Ring and Fibre Distributed Data Interface (FDDI) may benefit from the teachings herein. Loop 104 interconnects stations S1 and S2 such that digital data in accordance with Fibre Channel protocol standards flows around the loop in the direction indicated by a number of arrowheads. Only two stations are illustrated as being interconnected by loop 104 for purposes of simplicity. Hubs, such as hub 102 are configured with ports by which stations such as S1 and S2 may be connected with loop 104. In the present example, port 1 is used to connect SI while port 2 is used to connect S2. While the loop typically uses a fiber optic cable to conduct the digital data, the link between a particular port and associated station is not necessarily comprised of a pair of fiber optic cables. Accordingly, different forms of adapters (not shown) may be inserted into the ports, as will be described in further detail at an appropriate point below. It should also be mentioned the interconnection or link between each station and the hub is illustrated as being quite short in the present figure for illustrative purposes only and, in fact, the link may be quite long. Moreover, each station, including its interconnection with the hub and aforedescribed adapter, may be referred to as a lobe on the loop.

Figure 1:
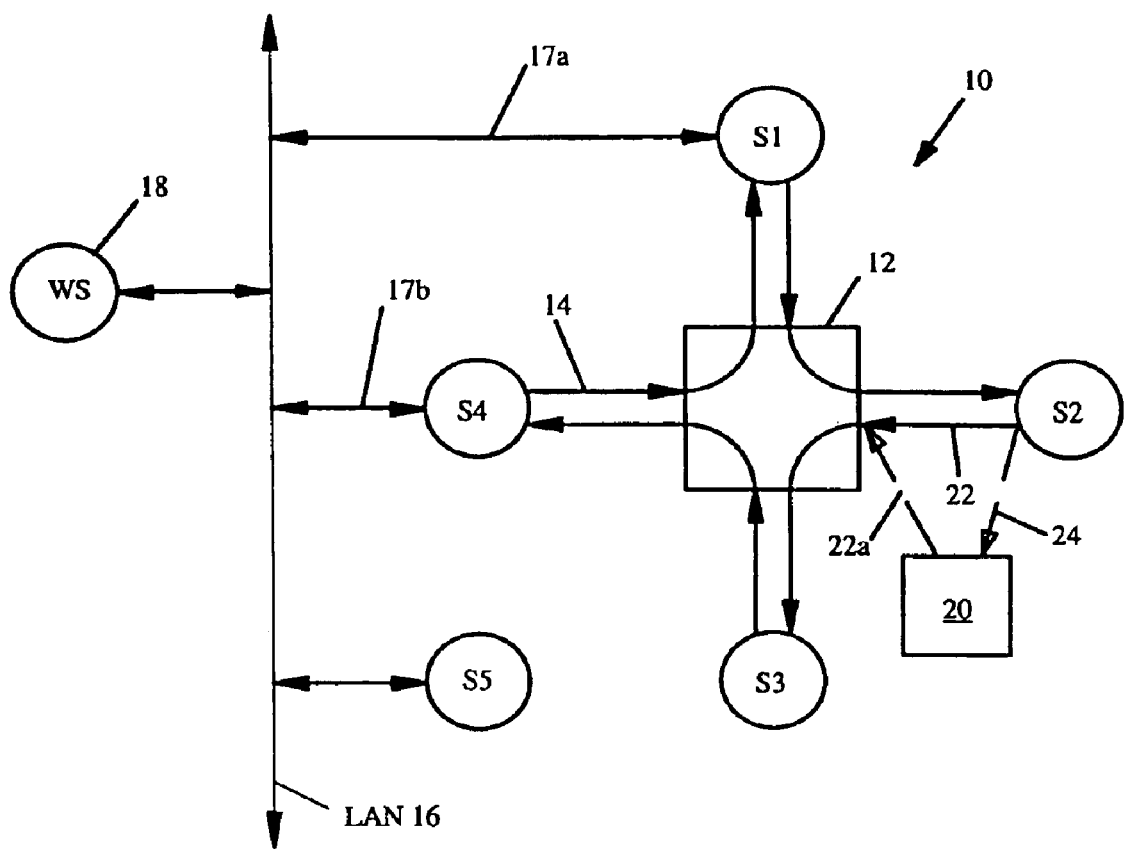
FIG. 1 is a block diagram illustrating a digital system including a prior art Fibre Channel hub and a prior art analyzer used with the hub.

Still referring to FIG. 2, in accordance with the present invention, hub 102 includes a first embodiment of a highly advantageous diagnostics arrangement generally indicated by the reference number 106. Arrangement 106 is made up of a Fixed Diagnostics Unit (FDU) 108 and a Roving Diagnostic Unit (RDU) 110. It should be appreciated that the FDU and RDU may be configured in a number of different ways in view of this overall disclosure. In FIG. 2, FDU 108 is illustrated in a form which allows it to listen to the digital data flowing around loop 104 at a single point 112 on the loop. RDU 110 is illustrated in a functional manner. That is, RDU 110, in the present embodiment, is shown as being connected with port 1 via a pair of dashed lines 114. However, in this embodiment, the RDU may be commutated selectively between the various ports as indicated by an arrow 116. As shown, the RDU is connected in such a manner as to listen to the data present at a port output point 118. By the term "listen", non-intrusive monitoring is meant. That is, data present at the point being monitored is observed, but operation of the system is not affected in any way. In view of the foregoing discussions related to FIG. 1 and specifically considering the use of an analyzer, it should be appreciated that the configuration of diagnostic arrangement 106 is highly advantageous. For the moment, it is sufficient to say that the advantages provided by this arrangement primarily derive from the ability to listen at a plurality of points distributed around loop 104. Furthermore, arrangement 106 is considered to be highly advantageous due to the fact that information is obtained and gathered at one location (i.e., within the hub) from all of the monitored points. In this manner, by using features of the RDU and FDU to be described, diagnosis may be performed in view of the system as a whole. Applicants are unaware of this capability heretofore. As mentioned above, loop 104 may have different data present at any of the points between different pairs of the stations distributed around the loop. Therefore, it has been extremely difficult in the past to gain a full understanding of problems such as those described with regard to FIG. 1. The present invention serves to alleviate these problems by initially recognizing the need for collection of data from points distributed around the loop and, thereafter, subjecting this data to analysis.

Figure 3:
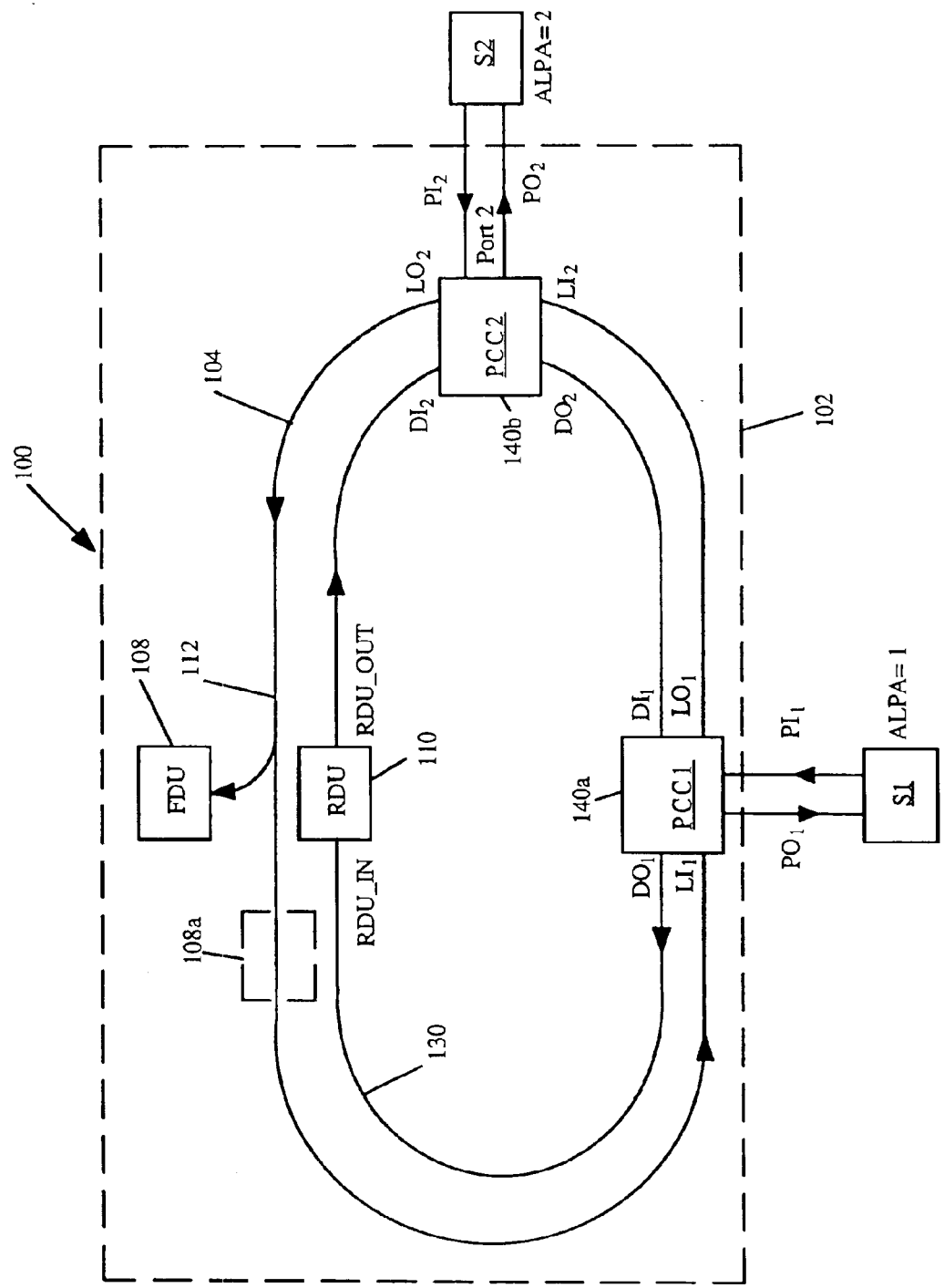
FIG. 3 is a block diagram illustrating the system of FIG. 2 shown here to illustrate further details of construction of the hub in accordance with the present invention.

Referring now to FIG. 3 in conjunction with FIG. 2 and having discussed several basic concepts of the present invention from a conceptual standpoint with regard to the first embodiment of the present invention using hub 102, a specific implementation of hub 102 will be described as depicted in FIG. 3. For purposes of clarity, hub 102 remains connected with stations S1 and S2 as is also shown in FIG. 2. For reasons which will become evident, this hub implementation will be referred to hereinafter as the diagnostic loop or inner loop configuration. Accordingly, the diagnostic loop configuration of hub 102 includes a highly advantageous diagnostic loop 130 which is submitted to be unknown heretofore. It should be noted that digital data traveling on the diagnostic loop travels in a direction which opposes the direction that data travels on main loop 104 for reasons given below. The diagnostic loop and main loop each pass through port control circuits PCC1 and PCC2 associated with ports 1 and 2, respectively. PCC1 is indicated by the reference number 140a while PCC2 is indicated by the reference number 140b. Each PCC includes a LOOP_IN (hereinafter LI) and a LOOP_OUT (hereinafter LO) connection interfaced with main loop 104. DIAG_IN and DIAG_OUT (hereinafter DI and DO, respectively) connections refer to the interface points with diagnostics loop 130. Further, each PCC includes PORT_IN and PORT_OUT (hereinafter PI and PO, respectively) connections. When the input or output connection of a particular PCC or the PCC itself is referred to, the appropriate port number designation will hereinafter be appended to the foregoing abbreviations. In addition, the RDU is interfaced in the diagnostics loop using RDU_IN and RDU_OUT connections. The port control circuits include a number of highly advantageous features. One important feature resides in the ability of the PCC's to listen to the data present on main loop 104. That is, the data on the main loop is copied onto the diagnostic loop by one of the PCC's and, thereafter, travels around the diagnostic loop to RDU 110 in a non-intrusive manner such that operation of main loop 104 is not affected, thus implementing the capability contemplated by the present invention requiring non-intrusive monitoring.

Figure 4:
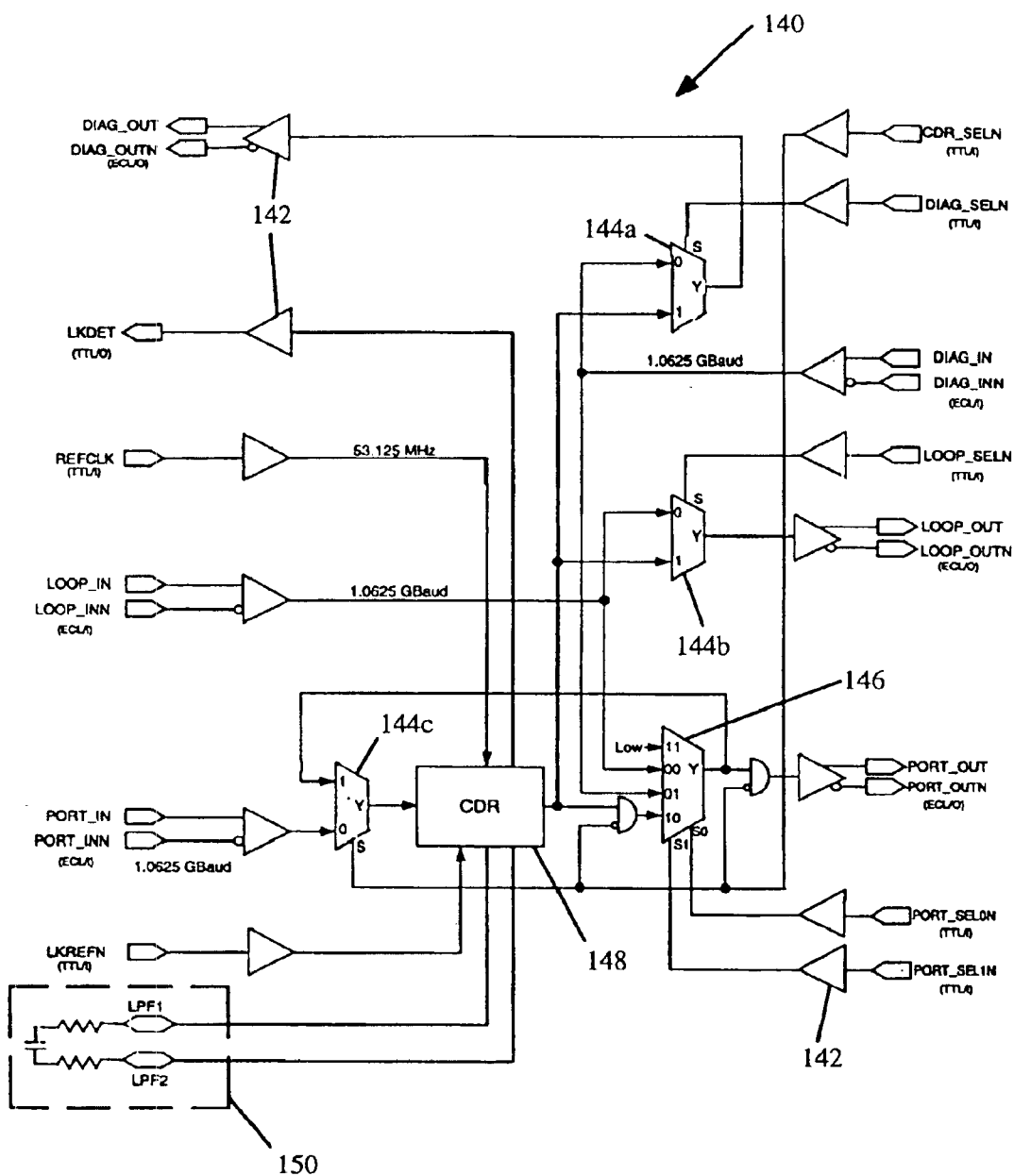
FIG. 4 is a schematic in block diagram form shown here to illustrate one implementation of an integrated port control circuit manufactured in accordance with the present invention and used in the system shown in FIGS. 2 and 3.

Referring to FIGS. 3 and 4, details regarding the design of the PCC's will now be described. PCC's have been produced in accordance with the present invention as integrated circuits per the block diagram of FIG. 4 which illustrates a PCC generally indicated by the reference numeral 140. PCC 140 will be described primarily in terms of this block diagram since it is considered that one of ordinary skill in the art may produce this circuit in view of this overall disclosure. PCC 140 includes a plurality of signal drivers several of which are indicated by the reference number 142 (not all drivers are indicated). One by two muliplexers 144a–c, a one by four multiplexer 146 and a Clock Data Recovery Section (CDR) 148. The latter is connected with a low pass filter section 150 indicated within a dashed line. CDR Section 148 serves to recover clock information from incoming data on PORT_IN and retime incoming data to this recovered clock. With regard to details of construction of PCC 140, it is important to note that the data paths defined by the circuitry are high frequency in order to carry the contemplated gigabaud per second data rate. Input and output lines have been labeled consistent with FIG. 3. Thus, LI (LOOP-IN), LO (LOOP-OUT), PI (PORT-IN), PO(PORT-OUT), DI (DIAG-IN) and DO (DIAG-OUT) are readily identifiable. Additionally, a number of selection/control lines are present including CDR_SELN, DIAG_SELN, LOOP_SELN, PORT_SEL0N and PORT_SEL1N. The functions of these various additional lines will become evident below.

TABLE 1

Signal Selection
(boldface type is recovered data)

| STATE | PORT_SEL0N | PORT_SEL1N | LOOP_SELN | DIAG_SELN | CDR_SELN | PORT_OUT | LOOP_OUT | DIAG_OUT |
|---|---|---|---|---|---|---|---|---|
| 1 | 1 | 1 | 1 | 1 | 1 | LOW | LOW | LOW |
| 2 | 0 | 1 | 1 | 1 | 1 | LOW | LOW | LOW |
| 3 | 1 | 0 | 1 | 1 | 1 | LOW | DIAG_IN | DIAG_IN |
| 4 | 0 | 0 | 1 | 1 | 1 | LOW | LOOP_IN | LOOP_IN |
| 5 | 1 | 1 | 0 | 1 | 1 | LOW | LOOP_IN | LOW |
| 6 | 0 | 1 | 0 | 1 | 1 | LOW | LOOP_IN | LOW |
| 7 | 1 | 0 | 0 | 1 | 1 | LOW | LOOP_IN | DIAG_IN |
| 8 | 0 | 0 | 0 | 1 | 1 | LOW | LOOP_IN | LOOP_IN |
| 9 | 1 | 1 | 1 | 0 | 1 | LOW | LOW | DIAG_IN |
| 10 | 0 | 1 | 1 | 0 | 1 | LOW | LOW | DIAG_IN |
| 11 | 1 | 0 | 1 | 0 | 1 | LOW | DIAG_IN | DIAG_IN |
| 12 | 0 | 0 | 1 | 0 | 1 | LOW | LOOP_IN | DIAG_IN |
| 13 | 1 | 1 | 0 | 0 | 1 | LOW | LOOP_IN | DIAG_IN |
| 14 | 0 | 1 | 0 | 0 | 1 | LOW | LOOP_IN | DIAG_IN |
| 15 | 1 | 0 | 0 | 0 | 1 | LOW | LOOP_IN | DIAG_IN |
| 16 | 0 | 0 | 0 | 0 | 1 | LOW | LOOP_IN | DIAG_IN |
| 17 | 1 | 1 | 1 | 1 | 0 | LOW | PORT_IN | PORT_IN |
| 18 | 0 | 1 | 1 | 1 | 0 | PORT_IN | PORT_IN | PORT_IN |
| 19 | 1 | 0 | 1 | 1 | 0 | DIAG_IN | PORT_IN | PORT_IN |
| 20 | 0 | 0 | 1 | 1 | 0 | LOOP_IN | PORT_IN | PORT_IN |
| 21 | 1 | 1 | 0 | 1 | 0 | LOW | LOOP_IN | PORT_IN |
| 22 | 0 | 1 | 0 | 1 | 0 | PORT_IN | LOOP_IN | PORT_IN |
| 23 | 1 | 0 | 0 | 1 | 0 | DIAG_IN | LOOP_IN | PORT_IN |
| 24 | 0 | 0 | 0 | 1 | 0 | LOOP_IN | LOOP_IN | PORT_IN |
| 25 | 1 | 1 | 1 | 0 | 0 | LOW | PORT_IN | DIAG_IN |
| 26 | 0 | 1 | 1 | 0 | 0 | PORT_IN | PORT_IN | DIAG_IN |
| 27 | 1 | 0 | 1 | 0 | 0 | DIAG_IN | PORT_IN | DIAG_IN |
| 28 | 0 | 0 | 1 | 0 | 0 | LOOP_IN | PORT_IN | DIAG_IN |
| 29 | 1 | 1 | 0 | 0 | 0 | LOW | LOOP_IN | DIAG_IN |
| 30 | 0 | 1 | 0 | 0 | 0 | PORT_IN | LOOP_IN | DIAG_IN |
| 31 | 1 | 0 | 0 | 0 | 0 | DIAG_IN | LOOP_IN | DIAG_IN |
| 32 | 0 | 0 | 0 | 0 | 0 | LOOP_IN | LOOP_IN | DIAG_IN |

Figure 5:
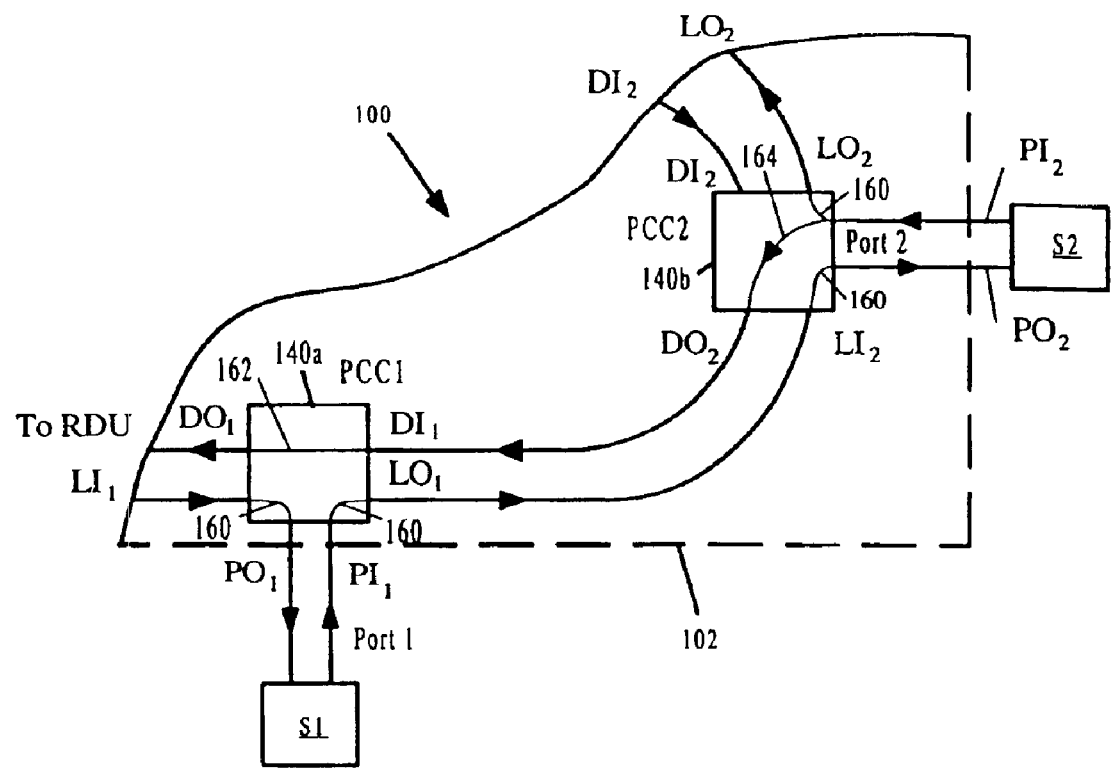
FIG. 5 is a partial cut-away view of the system of FIG. 3 in block diagram form shown here to illustrate monitoring in accordance with the present invention using the roving diagnostics unit.

Attention is now directed to Table 1 in conjunction with FIGS. 3–5. Table 1 indicates signal selections made using any PCC for a number of different combinations of inputs on the selection lines of that PCC while FIG. 5 is a cutaway partial view of the system which primarily shows the PCC's. It should be appreciated that the relatively large number of selection possibilities (i.e., states), evidenced by Table 1, provides a great deal of flexibility in the use of the PCC's. As an example, normal loop operation occurs in state 28 in which LI is connected to PO and PI is connected to LO. PCC1, in FIG. 5, is connected in this way as indicated using curved lines 160 such that data passes from the main loop through PCC1, out to the associated station, back to the PCC and then back onto the main loop. Such a station is "inserted" in the loop. Also, in-state 28, DI$_1$ is connected directly to DO$_1$ by a line 162. The purpose of this diagnostics loop connection will become apparent. The flexibility of the PCC becomes evident when one observes that in state 20, like state 28 LI is connected to PO and PI is connected to LO such that data passes through a station wherein the station serves as part of the main loop. S2 is illustrated in state 20 having curved lines 160 interconnecting the main loop with S2. Furthermore, PI$_2$ is connected with DO$_2$, as illustrated by a curved line 164, such that loop data from S2 is placed onto the diagnostics loop as well as continuing along the main loop. Thus, state 20 provides for placing data from PI (i.e., the output of the lobe on which the station resides, onto the diagnostics loop, while state 28 provides for routing the diagnostics loop through the PCC. In this way, data from a station "upstream" (i.e., S2 here) in the diagnostics loop relative to the station being monitored is able to flow to the RDU for analysis. While only two ports/stations are illustrated in the present figure, it should be appreciated that data may pass through any number of PCC's on the diagnostics loop in this manner.

Figure 6:
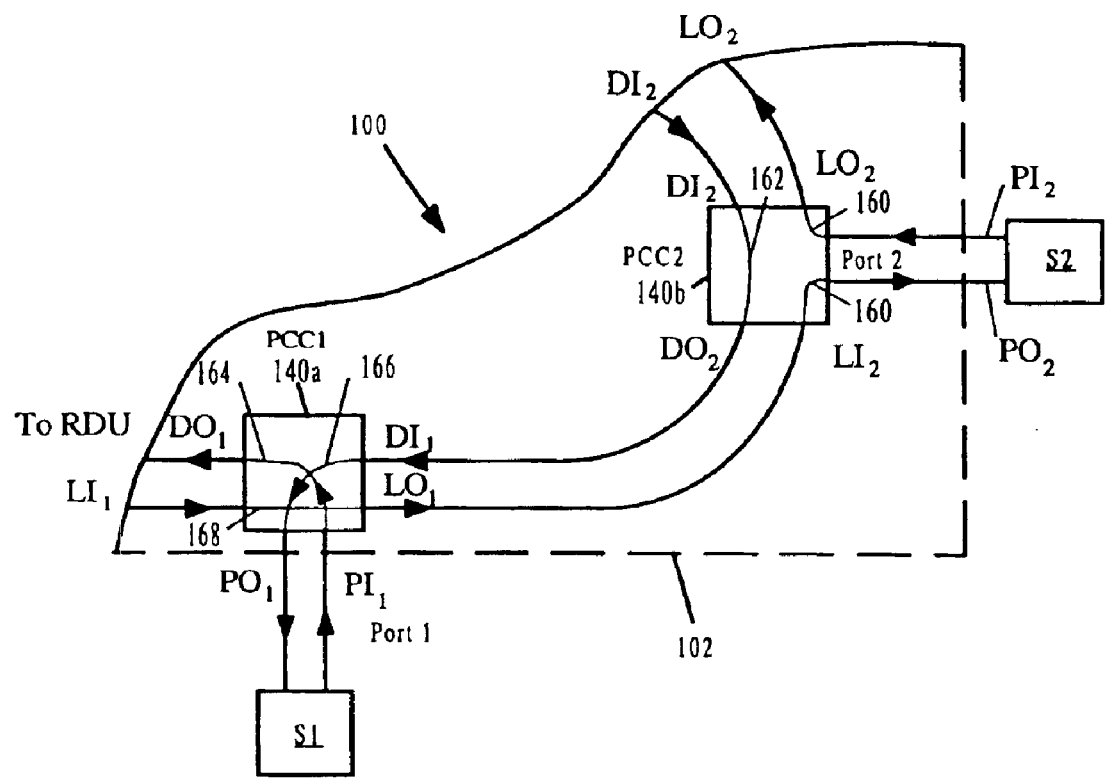
FIG. 6 is another partial cut-away view of the system of FIG. 3 in block diagram form shown here to illustrate other aspects of monitoring in accordance with the present invention using the roving diagnostics unit.

Still considering options presented by Table 1 with reference to FIGS. 3 and 6, it is also important to observe that the RDU may place data onto the diagnostics loop for receipt by the PCC's or, more specifically, by a selected one of the stations. For example in FIG. 6, if the RDU is to perform diagnostics on S1, PCC1 may be placed into state 23, such that DI is connected to PO as represented by a curved line 166, LI is connected with LO as represented by a line 168 and PI is connected with DO as represented by curved line 164. It should be appreciated that, in state 23, S1 is effectively removed from the main loop. At the same time, S2 is placed into previously described state 28 such that S1 is effectively placed in the diagnostics loop while S2 remains connected in the main loop and, as such, may operate normally. With the stations in this configuration, diagnosis of S1 using the RDU may proceed in a highly advantageous manner, completely isolated from the main loop. Hereinafter, testing of a module in the above described manner will be referred to as an RDU station diagnosis test. Other states of interest from Table 1 include state 22 and state 7. State 22 allows external loopback of data back to a station with the station out of the loop, while listening to the data with the RDU. This allows for offline diagnostics and is used to support a lobe verification test performed prior to station insertion, as will be described below. State 7 allows for internal loopback testing of a PCC using the RDU to send/receive data for use in hub self testing. It is noted that, in the event that an internal loop-back test is not successful, hub replacement is commonly indicated since the hub is not generally user serviceable. Further details will be provided below regarding the design of PCC's in accordance with the present invention.

Figure 7:
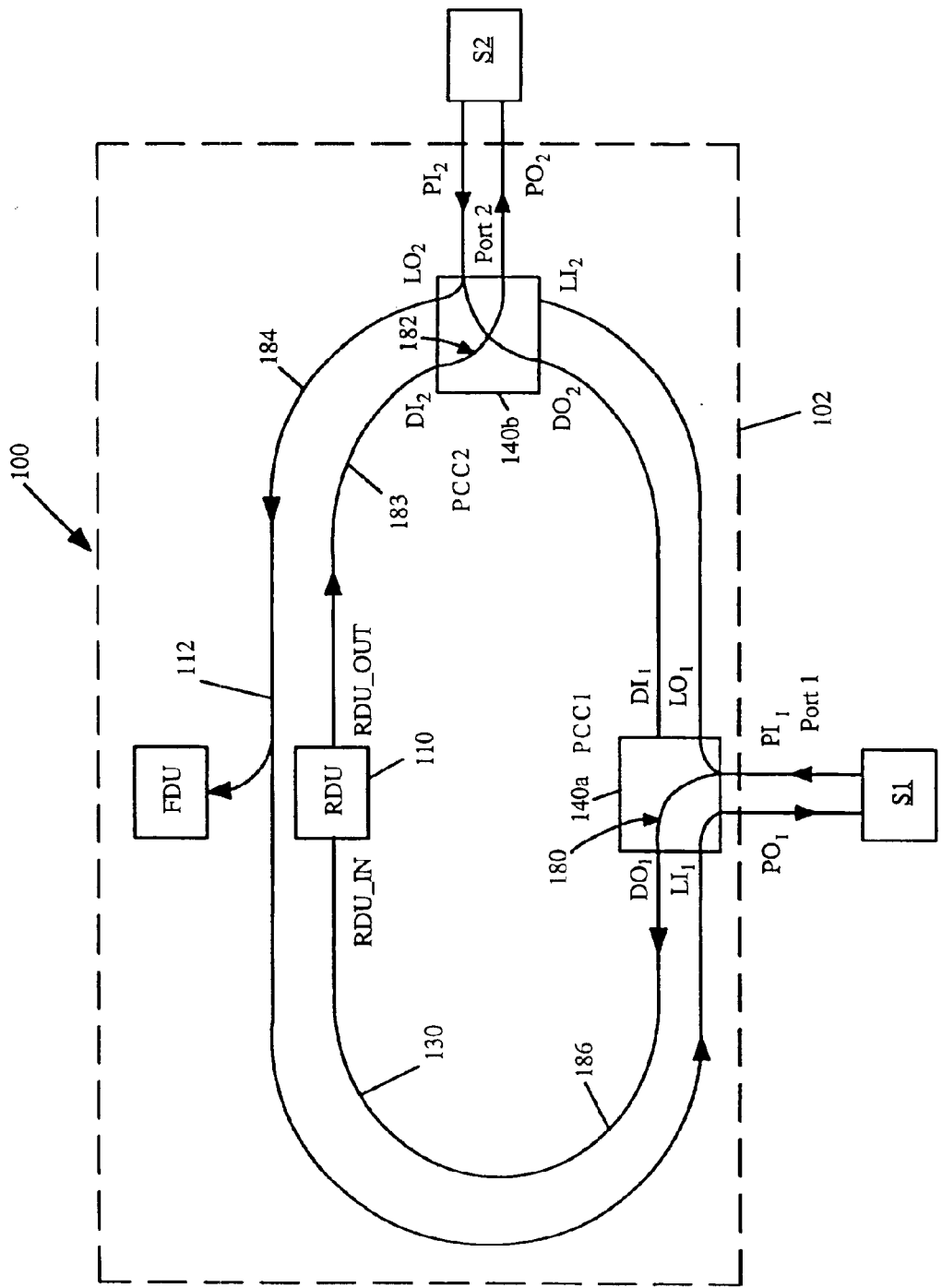
FIG. 7 is still another partial cut-away view of the system of FIG. 3 in block diagram form shown here to illustrate an initialization procedure performed in accordance with the present invention.

With reference to FIG. 7, attention will now be directed to other advantages of the present invention. System 100 is depicted during an initialization procedure performed in accordance with the present invention. Accordingly, it will be assumed for purposes of the present example that S2 is the object of a port insert. That is, S2 has possibly just been received within port 2 of hub 102 and wishes to be inserted into main loop 104 necessitating a loop reinitialization. An RDU station diagnosis test is performed on S2. This process (not shown here) begins in a first step by verifying that S2 has valid Fibre Channel data by connecting S2 in state 23 and S1 in state 28. While these connections are not specifically illustrated in FIG. 7, the reader is referred to FIG. 6 showing S1 in state 23 and S2 in state 28. It should be appreciated that a signal sent from the RDU to S2 will pass through PCC2, then through S2, back onto the diagnostics loop, through S1 to arrive back at the diagnostics loop. Having received the signal back, this first step performed by the RDU has been satisfied. That is, at this point the RDU knows by performing the RDU station diagnostic test that S2 has valid data input and so is ready to connect S2 into the main loop.

Still referring to FIG. 7, as a second step, S2 is connected into the main loop and the monitoring point for the RDU is moved to PCC1. Accordingly, PCC1 is placed into state 20 (described above), as indicated by curved lines 180 within PCC1, while PCC2 is placed into state 19, as indicated by curved lines 182, in which $DI_2$ is connected to $PO_2$ and $PI_2$ is connected to $LO_2$ as well as to $DO_2$. With this arrangement, the RDU can transmit a LIP to S2 via a segment 183 of the diagnostics loop and PCC2. PCC2 (assuming proper S2 operation) receives a response LIP back from S2 and places it onto a main loop segment 184 on which the LIP travels to PCC1. At the latter, the LIP is routed through S1 and then onto $DO_1$ to travel back to the RDU on a segment 186 of the diagnostics loop. In this way, it can be verified by the RDU that the LIP transmitted into S2 is received at S1. Having verified that the LIP has successfully traveled through all of the stations on the loop, the RDU may allow completion of the S2 port insert. In this regard, it should be appreciated that counter-rotation of the diagnostics loop in relation to the main loop is advantageous. As one advantage, this counter-rotation allows the port undergoing an insert to first receive the LIP from the RDU in a manner that is consistent with intuition. Thereafter, the LIP travels through all of the remaining stations on the loop. As another advantage, it is submitted that the counter-rotating diagnostic loop allows insertion of ports according to Fibre Channel loop protocol and that, without this feature, the port insert could be non-compliant. Moreover, if the diagnostics and main loops rotate in the same relative direction and the port to be inserted first receives the LIP (not shown), a segment conflict occurs on the diagnostics loop, which has not been illustrated for purposes of brevity, but which is readily demonstrable by one of ordinary skill in the art in view of this disclosure.

Figure 8:
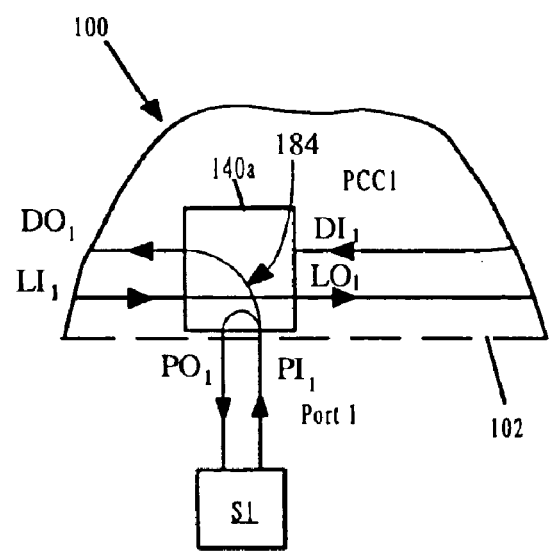
FIG. 8 is a partial cut-away view in block diagram form of the system shown in FIG. 3 shown here for purposes of illustrating another initialization procedure performed in accordance with the present invention.

Referring now to FIG. 8, another highly advantageous initialization procedure performed in accordance with the present invention will be described. Specifically, an automatic external loop-back test is performed during any port insert. FIG. 8 is a partial view showing S1 as part of system 100. The external loop-back test is depicted under way for S1 with S1 in state 22 from Table 1. State 22 connects $PI_1$ to $PO_1$ and to $DO_1$ while connecting $LI_1$ to $LO_1$, as indicated by a set of curved lines 184. It should be appreciated that the external loop-back test provides for verification of the entire lobe on which S2 resides including the lobe's complex high frequency paths. In fact, because the diagnostics loop is used for monitoring, the integrity of at least a portion of the diagnostics loop is also confirmed. It is submitted that Fibre Channel protocol is completely devoid of this feature, including the automatic implementation contemplated herein. Moreover, Applicant's are not aware of the provision of an automatic external loop-back test in any form of loop protocol that provides for simultaneous monitoring of the looped back data. Such an external loop-back test is effective in the diagnosis of a problem with PCC1. A particular advantage associated with this procedure resides in the fact that the procedure is performed by the unit itself in a rapid manner which is likely to be of great benefit to a system administrator. For example, a system administrator can be notified via a notification generated by the system following a failed port insert, while the failed port is held in bypass mode. This notification may be generated in the form of an email message which is particularly advantageous in instances where the system administrator is monitoring from a remote location.

Referring briefly to FIG. 2, it should be appreciated that the present invention may be implemented in an alternative embodiment (not shown) wherein "Port Diagnostics Units" (PDU's) are provided. That is, the combination of the FDU, RDU and diagnostics loop is replaced in favor of a PDU at each port. In this manner, loop data can actually be tracked during its progress around the main loop by the PDU's. It is contemplated that a PDU implementation of the present invention is practical particularly in the form of an ASIC in which the entire hub function is produced essentially as one chip. The introduction of the PDU implementation does not vary the basic concept of the present invention. That is, the advantages derived herein extend from the capability to "listen" at a plurality of points distributed around the main loop. A further advantage is provided, as mentioned, in the form of the ability to simultaneously listen to the distributed loop points. For example, the progress of a specific, individual ordered set can be tracked in its progress around the loop.

Having generally described several hub implementations in accordance with the present invention, details with regard to the diagnostics capabilities of the RDU and FDU will now be described. It should be appreciated that these capabilities may also reside in a PDU implementation. One feature incorporated in the RDU and FDU is ordered set detection. Fibre Channel protocol recognizes ordered sets as four ten-bit characters (FC-0). Ordered sets are used, for example, during loop initialization. The present invention monitors a particular group of ordered sets. This monitored ordered set group includes IDLE, LIP, LIP F7, LIP F8 (where LIP is Loop Initialization Primitive), SOF (Start of Frame), ARB (Arbitrate) and OPN (Open). In addition, any other valid ordered set may be specified as USR (User) as well as an Unknown ordered set and K28.5 (comma character) which is the first character that any ordered sets may have in common and, therefore, is useful in a determination that valid ordered sets are present. A number of features are related in a direct way to the ability to perform ordered set detection at the points distributed around the loop, at least one of which will be described immediately hereinafter.

Figure 9:
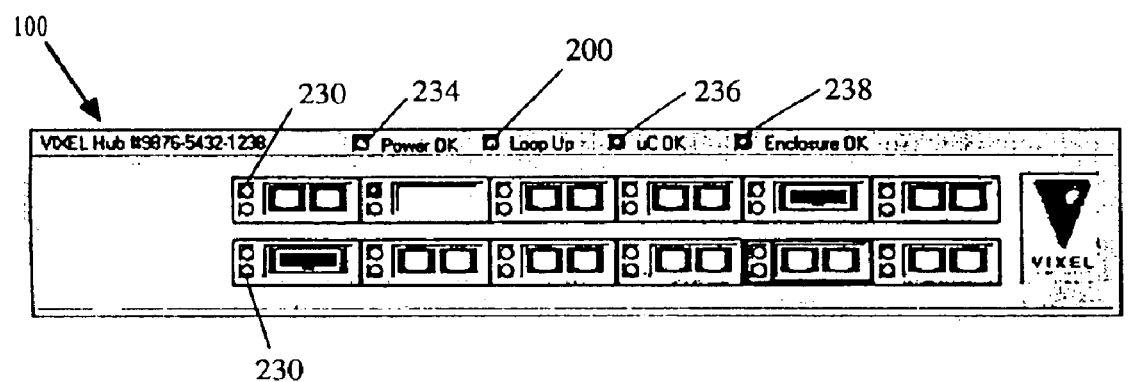
FIG. 9 is a diagrammatic illustration of the possible physical appearance of a port connection panel of a hub manufactured in accordance with the present invention shown here to illustrate features incorporated into the hub.

Turning to FIGS. 7 and 9, the present invention provides a feature related to the operational state of a Fibre Channel loop. This feature is presently implemented in both RDU 110 and in FDU 108. Presently, five loop states are used herein including INOPERATIVE (the loop is down), INITIALIZING, OPEN-INIT, UP and UP+FRAME (loop is up, with frames). The loop is considered as operational in either of the UP and UP+FRAME states. In FIG. 9, a view is provided which is representative of the physical appearance of the back of hub 100. In accordance with the present invention, a loop status indication LED 200 is provided which is illuminated whenever either of the loop states UP or UP+FRAMES are determined to exist. The presence of each of these two states is established using ordered set detection in conjunction with two additional detectors. The first additional detector detects an ordered set that is unknown and, hence, is referred to as an UNKNOWN detector. That is, the unknown ordered set is a valid ordered set but is not a member of the monitored ordered set group which is detected. The second additional detector is referred to as a LINK-USEABLE detector. In accordance with Fibre Channel protocol, more than a certain number of ones or zeros cannot occur in sequence. This certain number specifies a transition density which is a crude indication of invalid characters on the loop. Irrespective of ordered set detection, loop up indicator 200 is not illuminated unless the transition density has not been violated per the LINK-USEABLE detector. That is, if the link is unusable, the loop is said to be down. If no valid ordered sets are detected including the set specified by the UNKNOWN detector, the loop is also considered as being down.

The present invention recognizes that a Fibre Channel system will go to loop up in a sequence of ordered states that is identified through the use of the aforementioned monitored ordered set group. It should be appreciated that the monitored group of ordered sets will appear in sequence as a system moves from the inoperative state to an operative condition and that sequence must occur for proper initialization. Specifically, the first set which is monitored for from an inoperative state is a LIP. Upon recognition of a LIP ordered set, the INITIALIZING state is entered. In the INTIALIZING state, an arbitrate (ARB) or SOF ordered set is anticipated. Once an ARB or SOF is seen, status moves to the OPEN-INIT state. Thereafter, a CLS (close) command is anticipated which is used as a transition to the UP state. It is noted that the close command does not appear in the monitored set group, but is considered as a companion ordered set of the OPN command for use in closing a connection. Arrangement 100 then monitors for data frames (UP+FRAME) by detecting SOF. Thus, once the proper sequence of ordered sets has occurred, indication is provided, for example, via LED 200. Alternatively, the system administrator may sreceive an indication via software.

Another ordered set detection feature that is implemented in RDU 110 is a counter (not shown) that will count any ordered set for which information is desired to be gathered. For example, the counter can count frames at a particular port. If the counter is left active for a particular period of time, the number of data frames sent over that period is detected. In this way, traffic or events of interest can be monitored. Of course, if the data of interest is known to pass all the way around the loop, the RDU may be set to any monitoring point. As another example, the system administrator may wish to determine how much or how often a particular station is using the loop. Assuming that the system administrator wishes to establish this information for a station S7 (not shown) assigned ALPA-7, the counter can be set up to count ARBs or startup frames from S7. In this regard, it should be appreciated that ordered sets are 40 bits in length. The first 20 bits indicate what type of ordered set it is, while the next 20 bits give further details about the ordered set which usually includes the address of the station the ordered set came from. Accordingly, the counter can be set up to either use the ordered set just in terms of its type or to use the ordered set based on all or nearly all of the information available from the 40 bits. For example, only ARB ordered sets from S7 could be counted or, as another example, only ordered sets from S7 "talking" to a station S4 could be counted (not shown).

Another feature in accordance with the present invention resides in the ability to capture Arbitrated Loop Physical Addresses (ALPA's) by observing data patterns or communications on a loop. It is noted that the ALPA's are assigned to the various stations that are present on the loop during initialization. More specifically, present during initialization states referred to as OPEN and OPEN-INIT. Through the ability to listen at points distributed around a loop, the present invention is capable of determining which ALPA's are attached to each port. That is, an ALPA map can be generated. There are two methods used to establish the ALPA's connected to each port. In a first method, an ARB command is used. It should be appreciated that the use of ARB commands can reveal all of the active ALPA's on the loop while listening anywhere on the loop.

Referring to FIG. 3, in a second method of mapping connected ALPA's, an OPN command is used. When using OPN commands for this purpose, the listening point is moved around the loop to establish in which domain the OPN exists (i.e., where the OPN vanishes). For example, if S1 has an assigned ALPA of 1 and S2 has an assigned ALPA of 2, RDU 110 could first listen at S1. By examining ALPA's with ARB commands, ALPA-1 and ALPA-2 will be seen. Using the OPN ALPA mapper presently under discussion, however, only OPN's for ALPA-2 will be seen. Similarly, if the listening point is switched to S2, only OPN's for ALPA-1 will be seen. The disappearance of the OPN infers that the station at the listening point is assigned that ALPA. Certainty as to that being the correct ALPA is increased, as time passes, when that ALPA continues to be absent at that point. In this regard, a PDU implementation (not shown) is advantageous since the progress of an OPN around the loop can be observed simultaneously at all of the points around the loop. In this way, certainty is increased as to where an OPN disappears.

Having introduced the reader to a number of concepts of the present invention, an appropriate juncture has been reached at which some of its advantages can be emphasized. Specifically, it is important to understand that all of the capability discussed is provided in the hub itself. That is, the need for an external analyzer has been virtually eliminated. At the same, time, however, an external analyzer is inherently handicapped since its monitoring is intrusive, as described above. The present invention is inherently powerful based on the capability to monitor a plurality of points distributed around the loop. Other features such as, for example, ordered set detection and the counter are extremely useful in conjunction with this multi-point monitoring capability. It is submitted that such a combination of features has not been seen heretofore. In terms of problem identification, analysis can first be performed on the data to evaluate whether or not there really is a problem. In this regard, there can be conditions that are part of the normal operation of the loop, however, if these conditions persist, then they are a problem. Such problems can be identified with the multi-point data available through consolidation of information. From another viewpoint, the multi-point data is used to establish the status of each of the stations in the loop. A particular station or even the hub itself can be identified as the source of a problem. With status data as to the entire loop including the hub in hand, the status data can be displayed or automatic, predetermined responses may be taken. For example, a defect can be removed. Thereafter, operation of the system may resume automatically. Alternatively, an indication can be provided to a system administrator that the defect has been removed and operation can now be restored. In one feature to be described, beaconing may be employed to identify the actual physical location of a removed defect. Specific details with regard to the display of additional status information will be provided immediately hereinafter.

Figure 10:
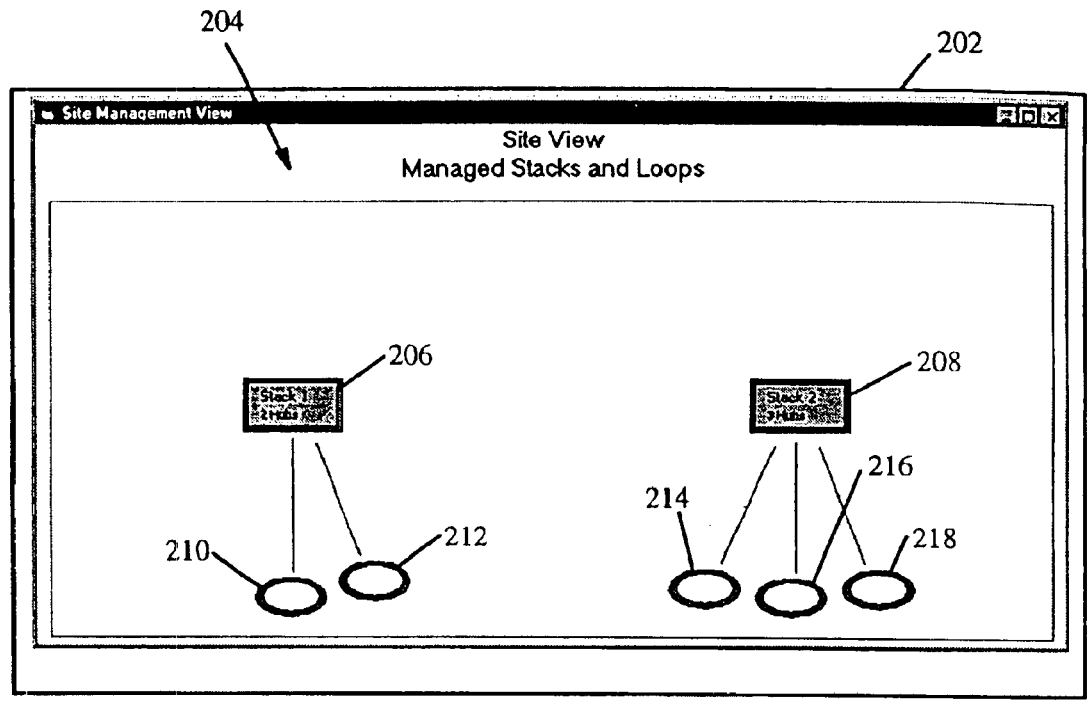
FIG. 10 is a diagrammatic illustration of a display screen showing a site management view in accordance with the present invention.

Referring to FIG. 10, a display 202 is shown depicting a site management view generally indicated by the reference number 204. The present example assumes a system having two managed stacks wherein stack 1 includes two hubs and stack 2 includes three hubs. Site management view 204 represents an encapsulation of the status of every device that is within the scope of management. Therefore, at the highest level, all of the managed stacks including stack 1 and stack 2 are indicated by the reference numbers 206 and 208, respectively. Also shown, in the form of elliptical circles, are the loops (each of which uses a hub) associated with each stack as indicated by the reference numbers 210 and 212 for the stack 1 hubs/loops and by the reference numbers 214, 216 and 218 for the stack 2 hubs/loops. It should be noted that the operational status of each loop is indicated by the color of the loop in the present view. For example, an up and operating loop is shown by the color green within the corresponding elliptical circle. If any of the loops are not green, further attention should be directed to these loops, for example, using further status display features of the present invention which are available by "drilling down" from the site management view. It should be appreciated that one advantage of the site management view resides in immediately directing the attention of an observer to problem areas, even in the instance of a system administrator having little practical experience. In this regard, it is contemplated that the site management view may be iconified in a way which makes problems apparent via the appearance of an icon.

Figure 11:
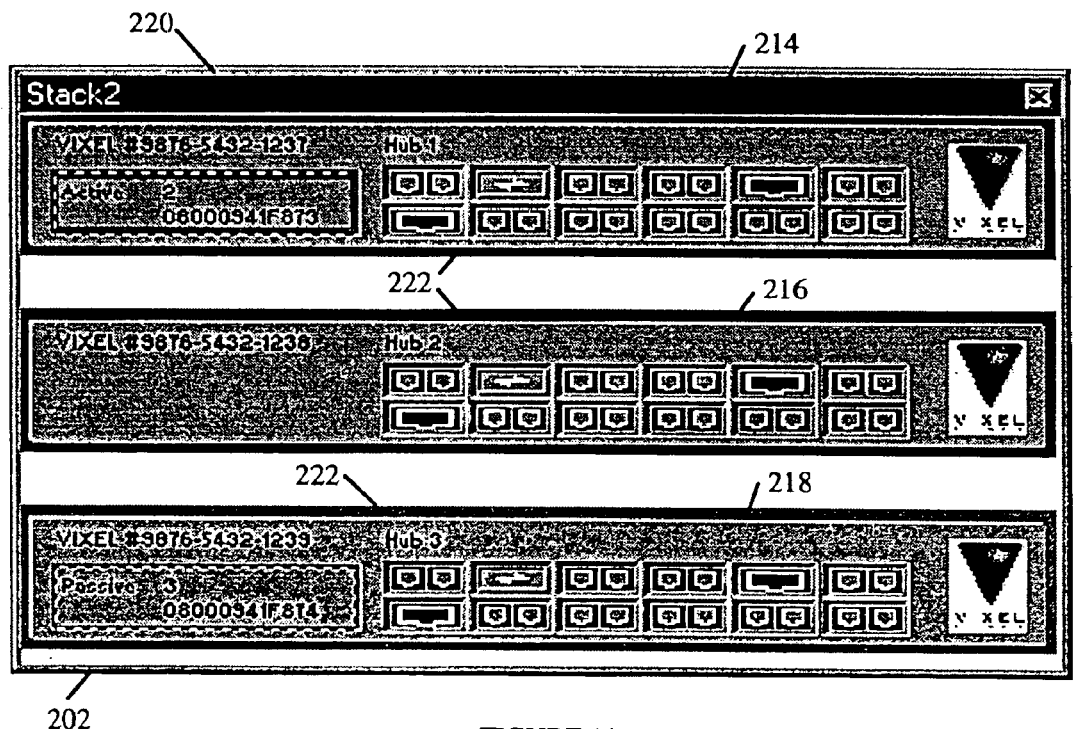
FIG. 11 is a diagrammatic illustration of display screen showing a stack view in accordance with the present invention which is obtained by selection in the site management view of FIG. 10.

Turning to FIG. 11 in conjunction with FIG. 10, selection of stack 2, for example by double clicking on it in the site management view of FIG. 10, brings up a stack view 220 on display 202. It is noted that hubs may be considered as being in the same stack by virtue of having some type of connection with regard to their management information. For example, the connection may comprise an out of band management cable. That is, this management data is not present on the loops themselves. Stack view 220 displays hubs 214, 216 and 218 (FIG. 10) labeled as Hub 1, Hub 2 and Hub 3, respectively. The stack view is intended to highlight information from a configuration standpoint. For example, what types of physical connections are present in each hub and whether these connections are optical (shortwave or longwave) or copper. These connection types will be discussed further at appropriate points below. In addition, it is indicated which of the hubs may possibly have management agents in them since the management agent is what provides the information used to make these determinations. A color indicator 222 (the color of which cannot be seen due to format limitations of the present application, as is the case throughout the figures) comprising the background of the stack indicates an overall status derived from the status of each hub. For example, the background is green if all of the hubs are fully functional.

Figure 12:
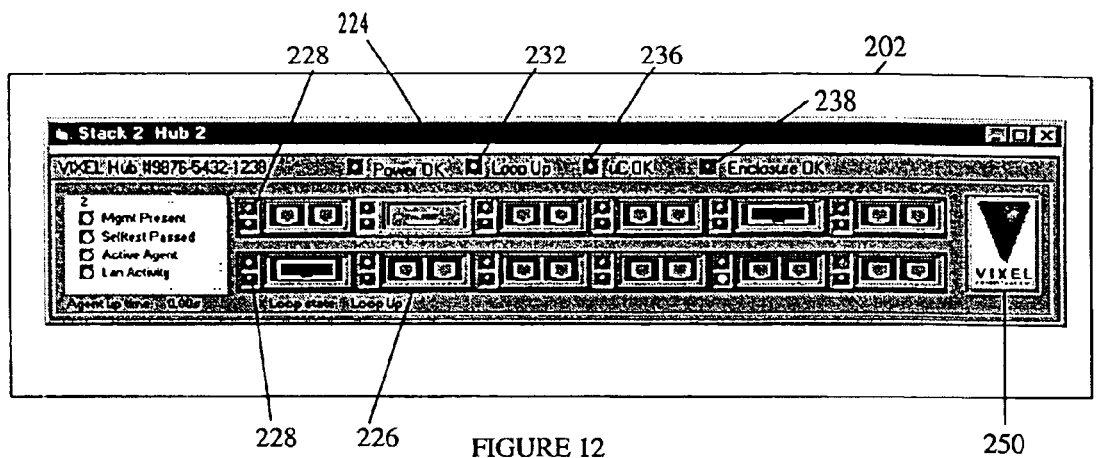
FIG. 12 is a diagrammatic illustration of display screen showing a hub view associated with one of the hubs shown in FIG. 10.

Referring to FIGS. 9–12, selection of one of the hubs in stack view 220 leads to a hub view 224 associated with the selected hub. FIG. 12 illustrates this view for Hub 2 of stack 2 (indicated by reference number 216 in FIG. 10). It is noted that additional Hub Views will be provided below. Hub view 224 may also be referred to as a back-of-box view since the image is intended to physically represent the appearance of the corresponding panel on the hub itself. It is noted that a great deal of the information available through the use of the present invention is presented in the hub view. At a glance, any of the ports can be seen including whether each port is in a functional status. Alternatively, it is indicated that ports need attention or a port is in a failure mode. This indication is provided by the background color 226 surrounding each port in gray, green, yellow or red (as noted above, color not illustratable) where gray indicates unused, green indicates functional, yellow indicates the need for attention and red indicates failure. Additionally, a pair of virtual LED's 228 are illustrated associated with each port. The actual LED's corresponding to these virtual LED's are indicated by the reference number 230 in FIG. 9 showing a pair of LED's is associated with each port. It is noted that both virtual LED's 228 and actual LED's 230 can be beaconed to cause the LED's to blink on display 202 as well as on the hub box itself, as will be further described. Thus, a good or bad indication can be provided for each port of the hub based on monitoring in accordance with the present invention. This feature is advantageous, for example, to anyone in helping to locate hardware of interest. In this regard, it is submitted that the capability to reflect the status of the loop and the use of beaconing, as described, have not been seen heretofore. It is also noted that a virtual "Loop Up" LED 232 is provided which corresponds to LED 200 in FIG. 9. That is, virtual Loop Up LED 232 is illuminated whenever LED 200 on the hub panel is illuminated. Other indications include Power OK 234, uC (microcontroller) OK 236 and Fan Fault 238 for which the actual and virtual LED's are indicated using the same reference number.

Figure 13:
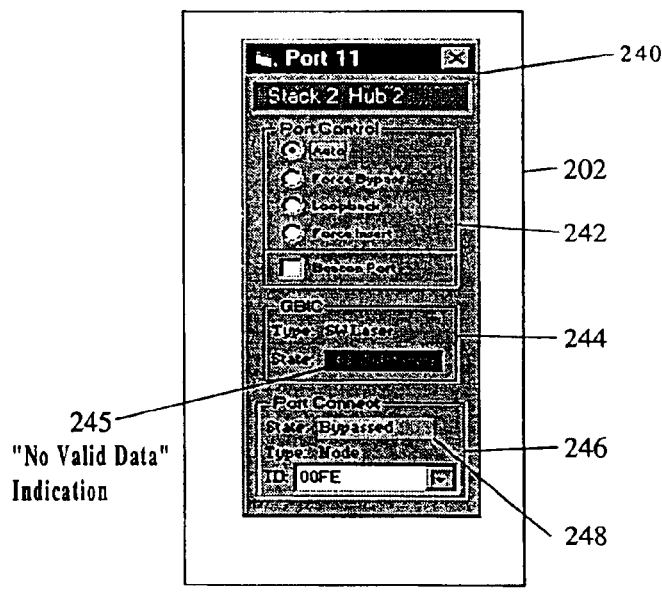
FIG. 13 is a diagrammatic illustration of display screen showing a port detail screen that appears through selection of one of the ports in FIG. 12 and which provides information and control facilities for the selected port.

FIG. 13 represents a port detail screen 240 which appears upon selecting one of the ports in FIG. 12. In this example, port 11 of hub 2 in stack 2 has been selected. A port control box 242 is included in the screen which provides four selectable modes under which the port can be operated. The auto mode is configured for maintaining loop integrity and enabling built in recovery functions at a policy level. That is, in the auto mode, ports will not be inserted that will bring the loop down. The auto mode gives the hub full license to make every port insertion go through criteria to maintain loop integrity. In effect, authority is given to screen every module such as, for example, a GBIC (Gigabit Interface/Interconnect Converter) that is plugged into this port prior to its insertion into the loop. That authority is removed, for example, if the Force Bypass mode is selected. In Force Bypass mode, the port will not be inserted irrespective of validity. The Force Bypass mode can be used to perform tests on an already inserted port or a port can be bypassed prior to its initial insertion. It is noted that other diagnostic capabilities can be invoked in the Force Bypass mode, as will be described. Several other modes can be invoked including Loopback and Force Insert. In the Loopback mode, the port receiver is connected directly to the port transmitter such that a station on the port may do diagnostic self testing (see, for example, FIG. 8). In a lobe initialization feature which represents an alternate and more powerful method for testing stations before insertion, the loopback capability built into the port is used to wrap receive back to transmit so as to cause the station to initialize completely before insertion. This feature has the advantage of providing much more confidence that the inserting station is fully functional before impacting the hub and all stations already attached. In the Force Insert mode, a node/station is inserted into the loop irrespective of its operational status. Such a feature may be useful if a node is not behaving well according to the Fibre Channel protocol and it is desired to force that node to be inserted into the loop for observation. For example, the node may not be going through proper initialization. The provision of all of these user selectable modes is highly advantageous with regard to giving the user full control over devices for purposes such as, for example, troubleshooting. In this regard, verification can be performed on devices that are being blocked out for reason of not behaving well. That is, a suspect device can be reinserted to observe whether or not it is bringing down the loop.

Still referring to FIG. 13, one feature present in the port detail view is a GBIC display box 244. It is noted that GBIC's have some built in identification information. This information is extracted for display here. The information identifies the specific type of GBIC. For example, a shortwave laser GBIC (as shown), a longwave laser GBIC or a copper GBIC with an HSSDC connector. A state indication 245 within GBIC display box 244 is obtained from both the GBIC and the diagnostic circuitry that is monitoring the port, as described above. A "No Valid Data" indication is illustrated. In this way, it is determined if there is a valid signal and whether or not the node is transmitting valid Fibre Channel characters. A port connect box 246 includes a state indication 248 that is produced by the present invention. While action can be initiated based on no valid data, the present invention further provides for bypassing a node that is in a loop failure state or transmitting LIP F8. For example, if a device is "LIP F8ing", port connect state box 248 will reflect that condition (not shown). Alternatively, if there is a problem with the transmitter on the GBIC itself, it will be indicated.

Figure 14:
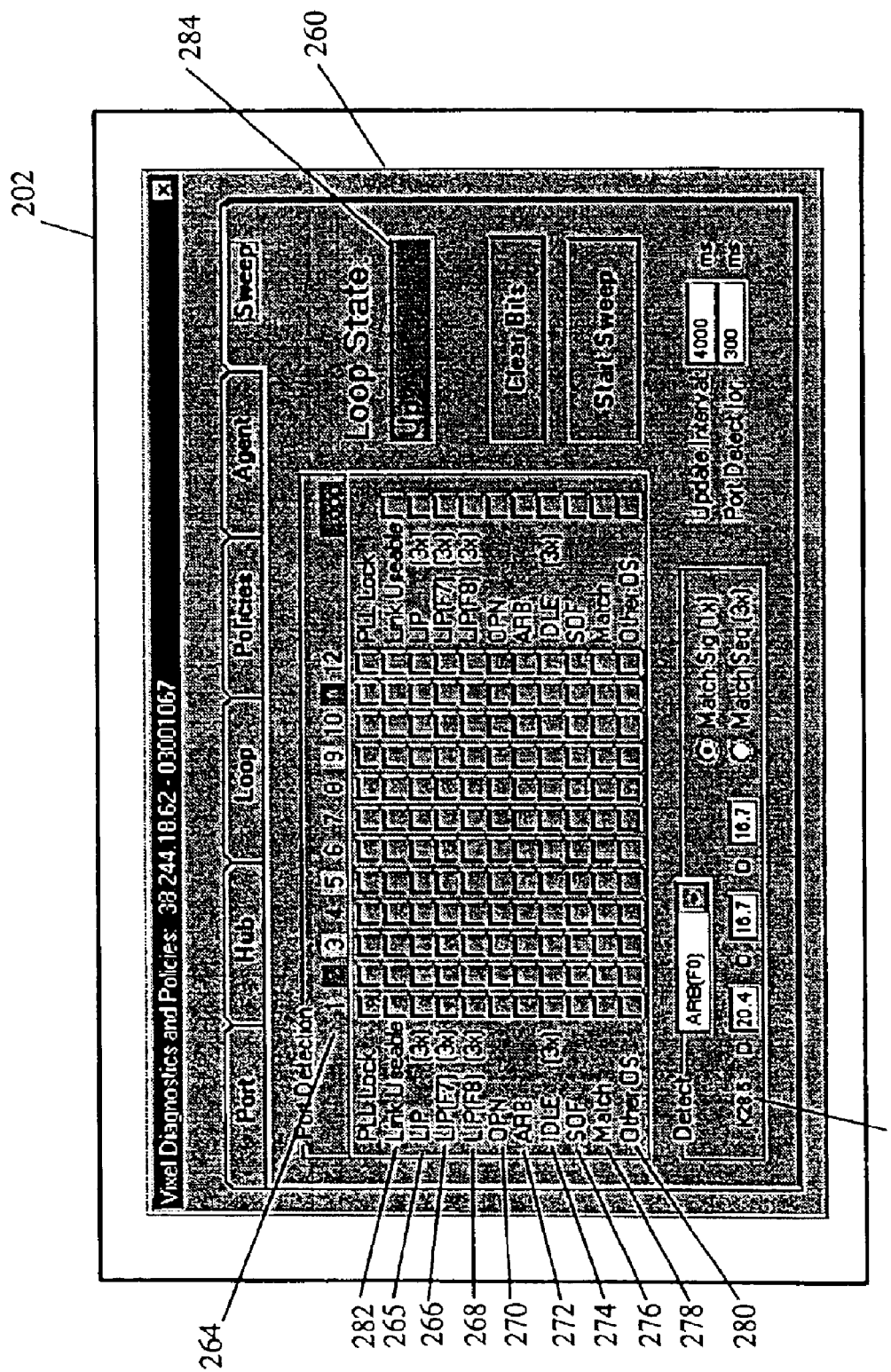
FIG. 14 is a diagrammatic illustration of display screen showing a hub sweep view in accordance with the present invention that appears through selection of a logo in FIG. 12 and which provides detailed information for each port in a single view.

Referring to FIG. 14, if Vixel logo 250 is selected in the hub view of FIG. 12, a hub sweep view 260 appears on display 202. The hub sweep view is comprised of a consolidated capture of data for all of the ports of the hub displayed in a meaningful way. Data is displayed corresponding to each port or node on the loop. The port numbers are indicated in a row 264. Beneath each port number is a column of boxes labeled to the far left with ordered sets. It should be noted that the monitored group of ordered sets, described above, is displayed forming a majority of the information in the column. Specifically, LIP is indicated by reference number 265, LIP F7 is indicated by 266, LIP F8 is indicated by 268, OPN is indicated by 270, ARB is indicated by 272, IDLE is indicated by 274, SOF is indicated by 276, USR (User Defineable) is indicated by "Match" at 278 and the Other ordered set (Other OS) is indicated by 280. A link useable indication 282 is provided along with a K28.5, comma character, indication 283. Therefore, the presence of an ordered set associated with each port may be indicated. It should be appreciated that, while quite a number of individual data are displayed, a system administrator can discern meaningful information from the display very readily. Even an inexperienced administrator will immediately recognize the value in this display. An experienced administrator, however, will be capable of correlating the data in view of his or her experience. Other displayed data includes a loop state display 284 which indicates whether the loop is up, down or initializing. Presently, an "Up" indication is being given. It is noted that the various display boxes of FIG. 14 may be arranged in any suitable manner and that a warning will come up if a user selects an non-automatic option.

With regard to interpretation of sweep display 260, initializing is a normal process that a loop will go through as the loop is starting up. Initialization should occur for a very brief period of time prior to the loop coming into the up or active state. If the loop stays stuck in initialization, the hub sweep view enables one to be able to see which nodes/ports are involved. More particularly, the presence of LIP F8 is displayed. The significance of this loop initialization primitive was described earlier. Therefore, if a node is in a LIP F8 state, from this sweep view one can readily see which is the offending node. Thereafter, mechanisms also built into the hub can be used to automatically recover. It should be appreciated that this display is highly advantageous since for each segment of the loop one can, at a glance, see exactly which data is being transferred. That is, if that segment is in a quiet state, if it's in initializing or if it's in a failure mode. Alternatively, further troubleshooting may be performed using other diagnostic screens to be described below. In this regard, the present invention provides a great deal of single port visibility through the monitoring that can be performed on a single port. By collectively displaying data gathered for all of the ports in a consolidated view, valuable information is provided as to what is actually going on in the loop. It is submitted that such a view is highly advantageous and has not been seen in a Fibre Channel system heretofore. In order to achieve a display such as this in the prior art, the number of ports would at least have to be doubled with analyzers residing at each of the added ports. Sweep display 260 has further implications. That is, by having the information available from the present invention, automatic actions can be implemented based on analysis of the data accumulated. It should be mentioned that sweep display 260 may be presented irrespective of whether a port or roving diagnostic implementation is used to collect the data.

Figure 15:
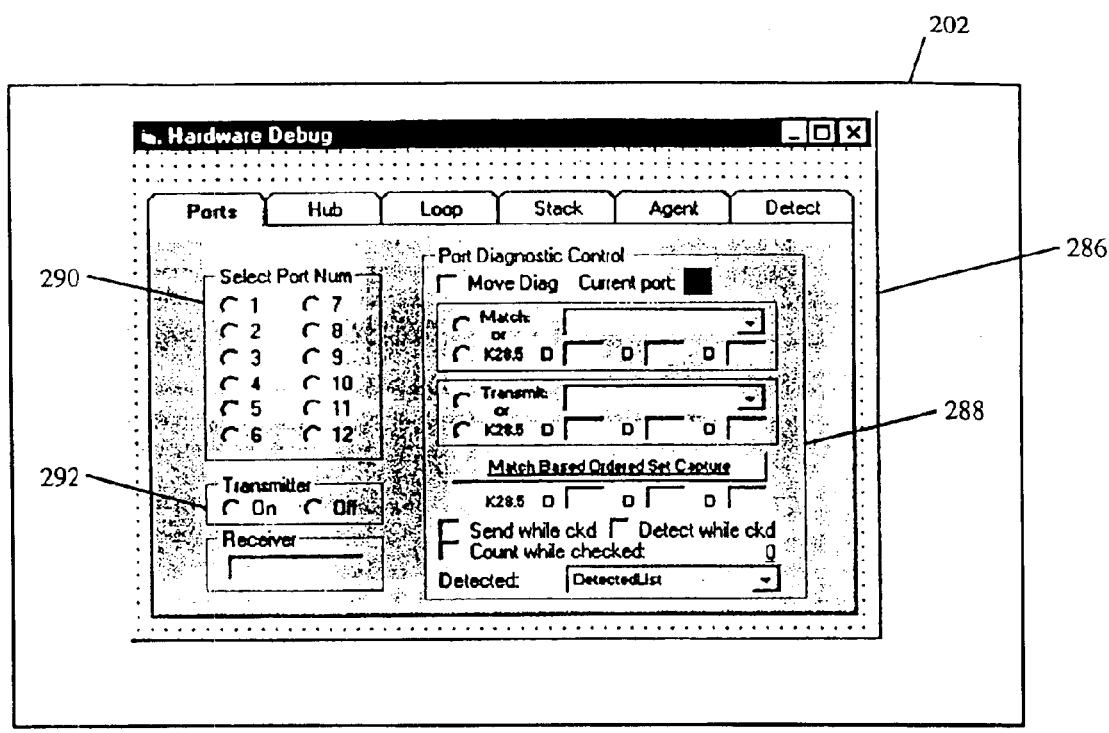
FIG. 15 is a diagrammatic illustration of display screen showing a per port diagnostic screen in accordance with the present invention.
Figure 16:
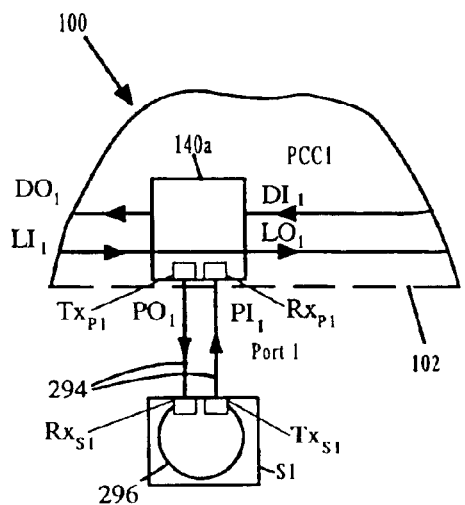
FIG. 16 is a partial cut-away view in block diagram form of the system shown in FIG. 3 shown here for purposes of illustrating full path end-to-end verification performed in accordance with the present invention on a lobe attached to the hub.

Referring to FIGS. 15 and 16, one example of a per port diagnostic screen 286 is illustrated. Port diagnostic screen 286 includes a port diagnostics control box 288, a port selection box 290 and a transmitter control box 292. Using port diagnostics screen 286, it should be appreciated that full path end-to-end verification can be performed from the hub on a lobe. As an example, FIG. 16 illustrates a portion of hub 102 connected with station S1. The lobe consists of the GBIC transceiver which includes a transmitter $TX_{P1}$ and a receiver $Rx_{P1}$. The lobe further includes a cable or fibers 294 extending from the hub to a node receiver $Rx_{S1}$ and a node transmitter $Tx_{S1}$ at the station. The latter may also include a loop state machine 296 that is diagrammatically indicated by an arc extending between the station transmitter and receiver. It is noted that during the full path verification, the hub bypasses the station, as illustrated (by $LI_1$ being connected to $LO_1$), such that the node is isolated from the main loop. In the absence of loop state machine 296, data that is sent to the station from the hub is expected to return to the hub so as to perform an end-to-end connection verification. In the presence of loop state machine 296 and being cognitive of the loop state machine implemented, however, an ordered set can be sent to the station which should return a different response. Thus, the operation of the loop state machine is verified as well as the connections in the lobe. The ability is provided to transmit to a port, receive on that same port and detect what ordered sets were seen on the receive. Lobe verification is highly advantageous with regard to diagnosis since there are numerous opportunities for points of failure around the lobe's path. For example, there may be a bad laser or a plug-in connection that is not fully seated. It should be appreciated that this verification is more powerful as compared with an external loop-back test.

In an external loop-back test (not shown), the station itself may do some verification with the port in bypass mode. The node would initiate the process and would transmit from $Tx_{S1}$ to $Rx_{P1}$. The hub will then loop that data to $Tx_{P1}$ to then pass the information back to S1 via $Rx_{S1}$.

The end-to-end lobe verification test of the present invention is considered to be highly advantageous (1) in verifying the node state machine without external interaction and (2) because the configuration on which the verification is successfully performed will not be physically disturbed for purposes of entering normal operation. That is, the configuration will not be disturbed upon entering normal operation. It is submitted that this feature has not been seen heretofore. While port diagnostics screen 286 provides a visual display for purposes of manipulating this lobe verification, the present invention contemplates the use of lobe verification in an automatic process. For example, a capability may be provided for an operator to do a full configuration verification by pushing one button. In response, the system would then go out, bypass every node and do the full path verification on each node. Thereafter, a display (not shown) of the configuration verification results can be provided.

Still referring to FIGS. 15 and 16, another capability is provided using transmitter control box 292. Through the ability to turn hub transmitter $Tx_{P1}$ on and off, another form of verification is provided. Specifically, node verification is provided in response to turning the port transmitter off to a node. If $Tx_{P1}$ is turned off, S1 should respond with a LIP F8, or the loop failure character, thus, serving as another mechanism of verification. The capability to selectively turn off a transmitter whereby to solicit a LIP F8 from a connected station may be referred to hereinafter as a transmit disable feature and is considered as being highly advantageous.

Figure 17:
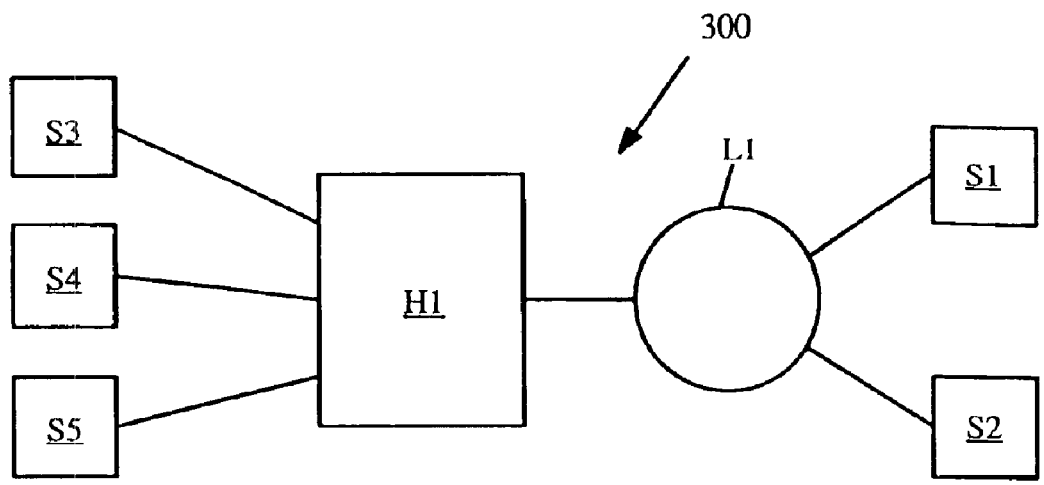
FIG. 17 is a diagrammatic illustration in block diagram form of a Fibre Channel system including a hub manufactured in accordance with the present invention for use in describing a number of highly advantageous features of the present invention including features relating to diagnostics for evaluation of remote, unmanaged devices.

Turning now to FIG. 17, a Fibre Channel system 300 is illustrated which includes stations S1–S5, a hub H1 and a loop L1. Stations S1 and S2 are connected in L1 while Stations S3–S5 are connected using H1. For purposes of the present example, it will be assumed that two tape backup operations are occurring in which S3 and S5 are both tape devices and S1 and S2 are servers. One backup is from S1 to S3 while the other backup is from S2 to S5. It should be appreciated that Fibre Channel is not a broadcast media. That is, without the hub of the present invention, there is no visibility to all data at all points in a loop. In addition, only two devices can be "talking" at once to each other using a loop. This holds with the aforementioned tape backups going on, since only two nodes can have control of the loop and be transferring data at any one time. Therefore, the two backup operations are in total contention for the bandwidth of the loop at this point in time. Assuming further that H1 is manufactured in accordance with the present invention, at least the ordered sets described above can be counted. Startup Frames (SOFs), for example, show data going through while ARBs show a node gaining control of a loop. By looking at these specific pieces of data, an indication may be provided that there is contention or as to the amounts of data that are being transferred such that, upon analysis of the data, recommendations can be made to either change the time assigned for one of the backups or to segment one backup onto another loop (not shown) since the simultaneous backups tend to slow one another down, as well as to prohibit any other use of the system. In essence, this feature is provided by using gathered information to give one a picture of the traffic or the data frames between the modules on the loop.

Still referring to FIG. 17, it is important to understand that information relating to S1 and S2 is provided despite the fact that loop L1 is not managed. In other words, determinations are made regarding a hub or a loop in which H1 is not actually physically directly monitoring the information on that remote loop or hub. These determinations as to the utilization of the remote loop can be made, however, because the hub of the present invention is connected to the remote loop. Utilization may be displayed, for example, in the form of a tachometer style gauge (not shown). Other features may be included such as a threshold for alarming purposes. It should be appreciated that the addition of a hub configured in accordance with the present invention is highly advantageous when added to an "unmanaged" system. Particularly, diagnostic capability will be provided for the existing installation as well as for components connected directly to the new hub. In the example of FIG. 17, with regard to unmanaged loop L1, managed hub H1 may not necessarily be able to identify whether it is S1 or S2 that is misbehaving on the unmanaged loop. However, a problem could certainly be isolated to the port of H1 with which the unmanaged loop is connected. It is submitted that these features with regard to visibility of utilization and congestion are highly advantageous and have not been seen heretofore.

Figure 18:
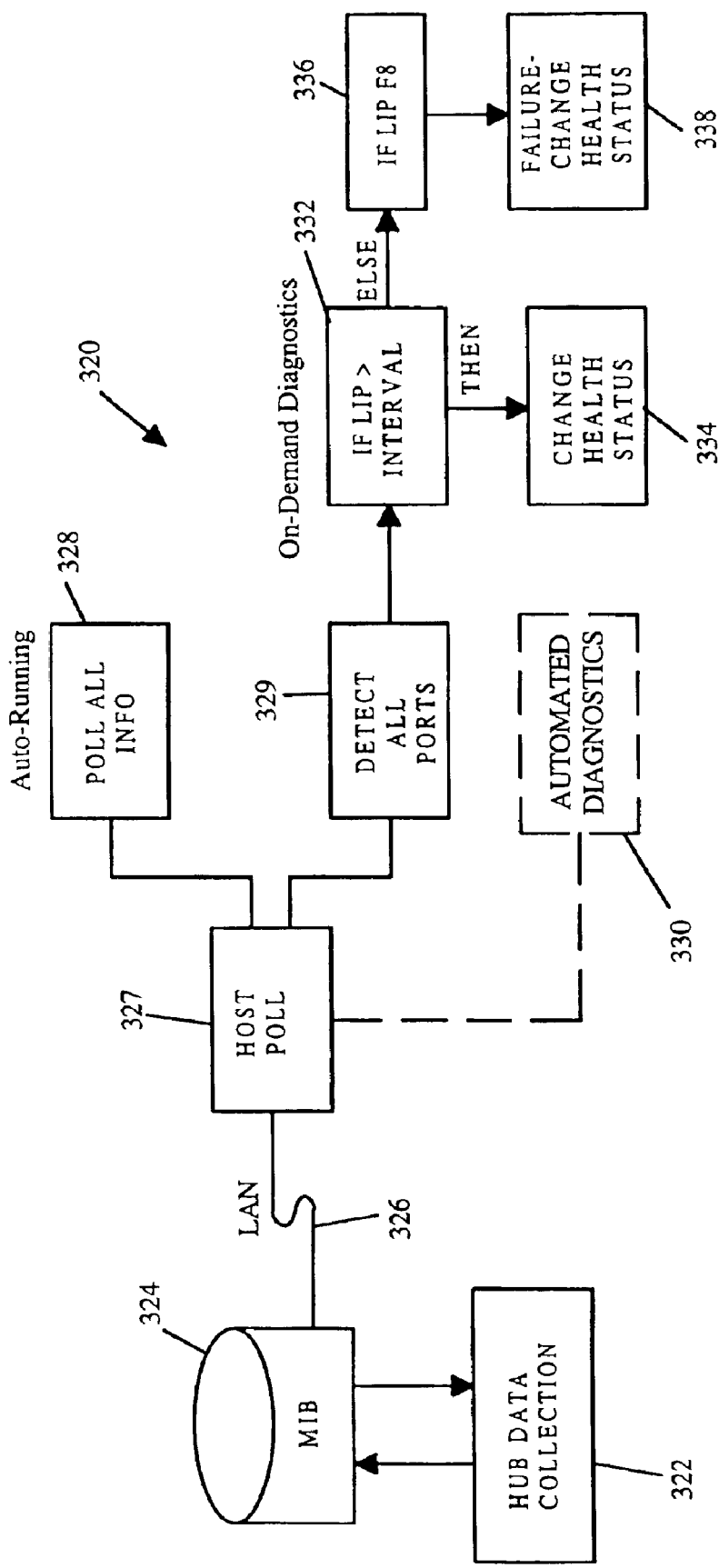
FIG. 18 is a diagrammatic illustration of a data management arrangement implemented on a host system including a method used in the host system for collecting data, evaluating the data and providing indications based thereon in accordance with the present invention.

Referring to FIG. 18 and having gone through a number of different displays, status indications and information displayed, a description will now be provided regarding details as to how these features are implemented using a data management arrangement 320. Initially, information is collected by a hub data collection section 322 which represents all of the hardware "hooks" that are built into hub 102 (FIGS. 2 and 3) manufactured in accordance with the present invention. This information is stored in a data repository 324 that is resident on a management card (not shown) that is built into the hub. The data is stored in an SNMP midstructure which is a standard management acquisition tool in networking. It should be appreciated that the available data stored in the memory itself provides the advantages herein (i.e., based on the origination points of the data) in conjunction with its subsequent analysis. The data is transferred via a LAN connection 326 in response to a host poll 327 which is generated by a host system that is not illustrated for purposes of simplicity. It is noted that host poll 327 and the remaining, as of yet undescribed portions of FIG. 18 relate to the method steps implemented within the host system. The information is polled in response to a request by an application running on the host system. That is, data repository 324 serves as an SNMP agent which collects the information in response to the host request. While FIG. 18 illustrates a poll driven system, it should be appreciated that an event driven system is also contemplated.

Referring to FIGS. 10–13 in conjunction with FIG. 18, the host polls information from the hub (or hubs) and will poll in an automatic poll 328 all data generically unless the system is in a diagnostic mode. Therefore, the polled information is used in site management view 204 (FIG. 10), stack view 220 (FIG. 11), hub view 224 (FIG. 12) and port detail screen 240 (FIG. 13). The poll of this information is performed at a regular interval which is usually resettable. Generally, the interval may be set from five seconds to each hour. The information is status information which may include, for example, whether a port has been bypassed and if the port has a signal. Thus, the information that is displayed in FIGS. 10 through 13 is polled continuously. Attributes of the data are assigned to a hierarchy of objects within the system. For example, attributes are assigned to a hub object, a port object or a stack object. Each object is based on knowledge of what components the particular object is composed. That is, a port "knows" that it has a signal and a GBIC may be associated with the port. If another port does not have a GBIC, the lack of a GBIC is actually an attribute of that other port. If a port does have a GBIC, then there are characteristics of the GBIC that are available. As further examples, a hub is comprised of ports and a stack is comprised of hubs.

Referring to FIGS. 10–14 and 18, certain characteristics are observed in looking at the information that is monitored. For instance, if a port goes into a bypass mode, it should be reported why the port went into that bypass mode. This forms part of the information that is displayed on a regular basis. It should be appreciated that in a diagnostic mode a different type of mechanism comes into play. For instance, when the hub sweep view of FIG. 14 is polled up, this different type of mechanism is employed. While information will still be polled, control information will be sent as well. Thus, if hub sweep view 260 (FIG. 14) is initiated, the hub will use its detector arrangement (i.e., RDU or PDU's) to get information for each port such as the different ordered sets described above. This information will be displayed and observed for the presence of a port in LIP F8. If the latter occurs, an indication is provided that the port transmitting LIP F8 is in a failure status and needs attention. For example, if such a port is in a forced insert mode, the entire loop will be brought down. The status of the port can be reflected all the way up to the loop level (FIG. 10) while, if the port number is displayed, the background of the port is highlighted to reflect status. For the LIP F8 failure status, the background highlight is red. Color highlights are represented in monochrome form around ports 2, 3, 5, 9, 10 and 11 in FIG. 14. In sum, two forms of diagnostic activity occur. The first is automatic poll 328 which is auto-running all of the time while the second is an intrusive/on-demand poll beginning with step 329 that occurs on demand. The automatic poll monitors all components and objects in the system using a generic health associated with each. This generic health may be reflected up, for example, with the occurrence of a LIP F8, as described. The on-demand poll is used in more detailed or specific monitoring (FIG. 14) and will be described in further detail hereinafter. The present invention also contemplates the use of automated diagnostics 330, as mentioned above with regard to event driven diagnostics.

Referring to FIG. 18, the on-demand diagnostics operate first by detecting all ports in step 329 to determine which ordered sets are going past each port. In this way, a determination is made as to whether or not the loop is functional. More specifically, if OPNs, ARBs, and startup frames (SOF) are going past, these are valid, operational loop ordered sets. In contrast, if there are loop initialization primitives going around for longer than a very short period of time (e.g., a second would be a long time), the loop is stuck in initialization which will be reflected up through indications. Thus, in step 332, if LIP's occur for greater than some predetermined interval, health indication is changed in a "change health status" step 334 for display purposes. Other notification mechanisms may be provided, as well. In step 336, if LIP F8 is detected, step 338 changes the health status to the failure mode. While the present discussions are centered upon Fibre Channel, it is considered that the method of the present invention can be used in other systems. That is, the characteristics of the data in a particular system may allow provisions for the same sort of detection capability. For example, if detection were performed in other protocols such as in an Ethernet hub in the disclosed manner (at the bit level monitoring non-invasively at distributed points), it is submitted that this method is new.

As described above, IDLE characters are included in the monitored group of ordered sets. A discussion will now be provided as to a number of features that are available as a result of idle detection coupled with the overall monitoring configuration of the present invention. Initially, it is noted that if an idle mode is present (i.e., idles are being passed around a loop by the stations connected therein) and a cable is cut, for example, to a node, that node or station will begin transmitting LIP F8. In accordance with the present invention, that node will automatically be bypassed such that the quiet state of the loop is restored. In another feature, the presence of essentially nothing but idles on a loop indicate that a loop is not being utilized. If a pattern develops, for example, every evening between 10 p.m. and 2 a.m. nothing but idles are seen, an opportunity is provided for performing activities such as backup. Thus, recommendations can be made for these quiet times to do batch processing so as to better utilize the data link. In still another feature, the reader is reminded of the foregoing discussion relating to detection of valid Fibre Channel characters. If a node starts corrupting IDLE characters, the present invention will detect the fact that these are not valid IDLE characters. In response, the node which is corrupting the IDLEs will automatically be bypassed. It should be appreciated that this feature is highly advantageous. By proactively intervening upon detection of the corrupted IDLEs and, thereupon, disallowing the offending node from participating, there is no loss of actual data. Thereafter, a notification may be provided with regard to the occurrence of the corrupted IDLEs.

Figure 19:
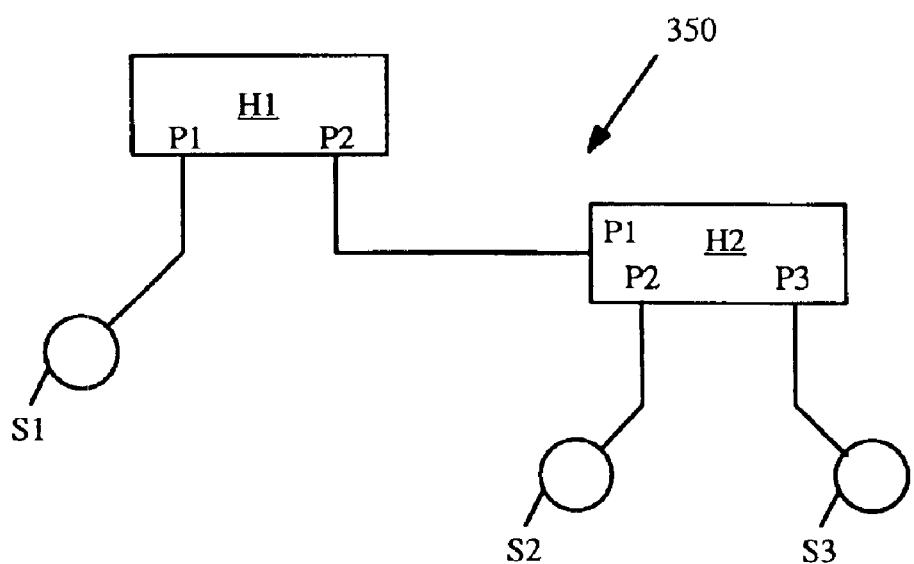
FIG. 19 is a diagrammatic illustration in block diagram form of a Fibre Channel system including two hubs manufactured in accordance with the present invention for use in describing topology mapping performed in accordance with the present invention.

Attention is now directed to FIG. 19 which illustrates a Fibre Channel system produced in accordance with the present invention, generally indicated by the reference number 350, for purposes of a discussion of topology mapping in accordance with the present invention. System 350 includes hubs H1 and H2 manufactured in accordance with the present invention. Station S1 is connected to port P1 of H1 while station S2 is connected to port P2 of H2 and station S3 is connected to Port P3 of H2. Port P2 of H1 is connected to port P1 of H2 forming a hub to hub connection. It is assumed that ALPA 1 is assigned to S1, ALPA 2 is assigned to S2 and ALPA 3 is assigned to S3. It should be appreciated that ALPA detection can be applied, as described with regard to FIG. 3, to determine which ALPA's are connected to each port. In the present example, ALPA mapping, in and of itself, will correctly show that ALPA 1, or S1 is connected to P1 of H1. By running an ALPA map on H2 port 1 from H1 port 2, however, ALPA 2 and ALPA 3 (i.e., S2 and S3) will be seen as connected to H1 port 2. In this regard, it is apparent that ALPA mapping does not reveal devices that may be intermediately connected between the stations. Accordingly, it is an objective of the present invention to perform topology mapping identifying intermediately connected devices. In one topology mapping feature, the present invention includes an arrangement for identifying hubs to other hubs such that, if two of these managed hubs are connected together, one hub will recognize that it has a managed hub connected to it and relay that information to a management application. Knowledge of the hub to hub connection will permit the correct locations of S1 and S2 to be identified. This feature is facilitated through identification/serial numbers that are built into the hubs.

The transmit disable feature described with regard to FIG. 16 is highly advantageous for use in another topology mapping feature. Specifically, one method used in accordance with the present invention is to check response to the transmit disable feature. If an attachment is a station, it will respond with a LIP F8. In other words, receipt of LIP F8 in response to a transmit disable confirms the presence of a station on the particular lobe served by the disabled transmitter. If, however, a prior art hub rather than a station is on the particular lobe served, the hub will not respond with LIP F8. Still another topology mapping feature is provided which is also submitted to be highly advantageous and which is designed for use with managed hubs in accordance with the present invention. In this feature, following an attachment request received by a managed hub, the managed hub will transmit a burst of LIP F7 to the requesting connection prior to insertion. If the attachment request is from a station, the station will respond to the burst with LIP F7 followed by a stream of IDLES for 15 milliseconds. During the 15 millisecond period, an ARB FB is transmitted to the requesting connection. If the requesting connection is a station, the ARB FB will not return to the hub. Alternatively, if the connection is a hub, the ARB FB will return to the hub. In the event that the ARB FB is returned, the hub will attempt to exchange serial number information via special ordered sets. If the attaching hub is another managed hub manufactured in accordance with the present invention, a serial number other than the first hub's will return. Conversely, if the attaching hub is an unmanaged hub, the serial number of the first hub will return. Therefore, one advantage of this feature is the capability to gather enough information to describe the sequence of connection of hubs by serial number. Once the sequence can be detected, it is also possible to determine if hubs are connected improperly and report problems. It should be appreciated that a significant challenge for system administrators concerning complex configurations is to confirm that the wires/fibers got connected as intended. This level of topology mapping provides the needed feedback.

In sum, with regard to the topology mapping features described thus far, ALPA mapping allows determination of the ALPA's that are connected to a port. The transmit disable feature, in which the transmitter to the connection is turned off before the connection is allowed on the loop, allows identification as to whether the device on the connection is a station or another hub. Identification of serial numbers of other hubs allows for locating managed hubs and providing their identification numbers.

Referring to FIG. 3, it should be appreciated that hub 102 of the present invention is a repeated hub. Data comes into the hub serially and goes out serially with no delay or imperceptible delay. The hub of the present invention may be an elastic device. This elasticity may be in either in the FDU or RDU 110. In this regard, an elastic FDU 108*a* is illustrated by a dashed line in a series connection with main loop 104. It is noted that RDU 110 may be elastic, as shown. Data comes into the hub serially, gets converted from serial to parallel, and then is clocked by a separate clock to retime the data. It should be appreciated that the hub of the present invention should be elastic because, depending on the difference between the incoming clock and the local clock, the hub may have to either insert words or delete words. The term elasticity describes absorbing the difference between the clock signals, retiming the data and resetting the jitter to zero. More importantly, what is added is the ability in the hub to insert ordered sets or frames into the data stream and then also remove the inserted data from the data stream without interrupting the normal flow of data. For example, an ordered set can be inserted onto the loop which then can go through a number of devices and come back to the hub to then be removed such that the inserted ordered set does not continue to circulate. Since a request is inserted, it can also be established when the request returns to the hub. Therefore, by observing such a request on one lobe using the RDU, it can be determined what is connected on the lobe as well as the length of the connection since the delay in return can be timed.

Referring to FIG. 19, as previously discussed, ALPA mapping using OPN's allows for locating devices that are quiescent. In other words, locating devices that are not open and are not arbitrating for the loop. For example, if S1 is quiescent, it will not send out ARB's or be opened by another device. Therefore, an ALPA map based on active devices will not see S1. The proactive approach of the present invention permits sending out queries to any station to elicit a response, whether the station is active or not, in performing topology mapping. As mentioned, in order to insert and remove these queries, elasticity is provided within the hub with the additional benefits of retiming the data and reseting the jitter to zero. For example, in FIG. 3, elastic FDU 108*a* retimes data and resets jitter between PCC1 and PCC2.

Figure 20:
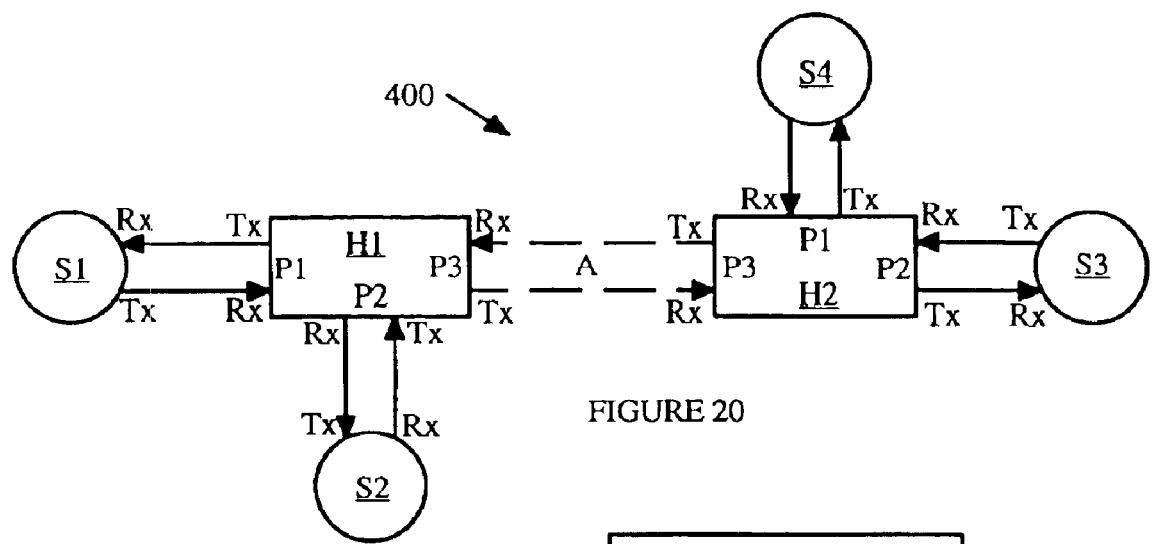
FIG. 20 is a diagrammatic illustration in block diagram form of a Fibre Channel system including two hubs at least one of which is manufactured in accordance with the present invention for use in describing hot cascading performed in accordance with the present invention.

Attention is now directed to FIG. 20 for purposes of a discussion of hot cascading performed in accordance with the present invention. FIG. 20 illustrates a system manufactured in accordance with the present invention and generally indicated by the reference number 400. System 400 includes hubs H1 and H2 wherein at least H2 is produced in accordance with the present invention. Stations S1 and S2 are connected to H1 while stations S3 and S4 are connected to H2. Initially, it is assumed that the hubs are not connected such that two loops are operating separately. Thus, S1 and S2 may be assigned ALPA 2 and ALPA 1, respectively, on H1. At the same time, S3 and S4 may be assigned ALPA 1 and ALPA 2 on H2. Cascading itself is the process of connecting the hubs to one another via a connection path "A". Hot cascading denotes the fact that the separate loops are already active and the addressees (ALPA's) are already assigned on the separate loops present on H1 and H2. However, as is the case here, it should be appreciated that the ALPA's may be the same for the stations on each loop. That is, both S2 and S3 are assigned ALPA 1 and both S1 and S4 are assigned ALPA 2. Therefore, closing connection A can have disastrous results unless special precautions are taken. For example, it is desirable to avoid events such as data intended for ALPA 2 on H2 to be written to ALPA 2 on H1. As another example, if S2 with ALPA 1 tries to send a command to ALPA 2 on H1 (i.e., S2), it can be seen that because of the direction of the loops the first station having ALPA 2 that this data will encounter is S4 on H2. Thus, it should be assured that such events do not occur as a result of hot cascading. The present invention provides two methods for performing hot cascading, as will be described immediately hereinafter.

Figures 21, 22:
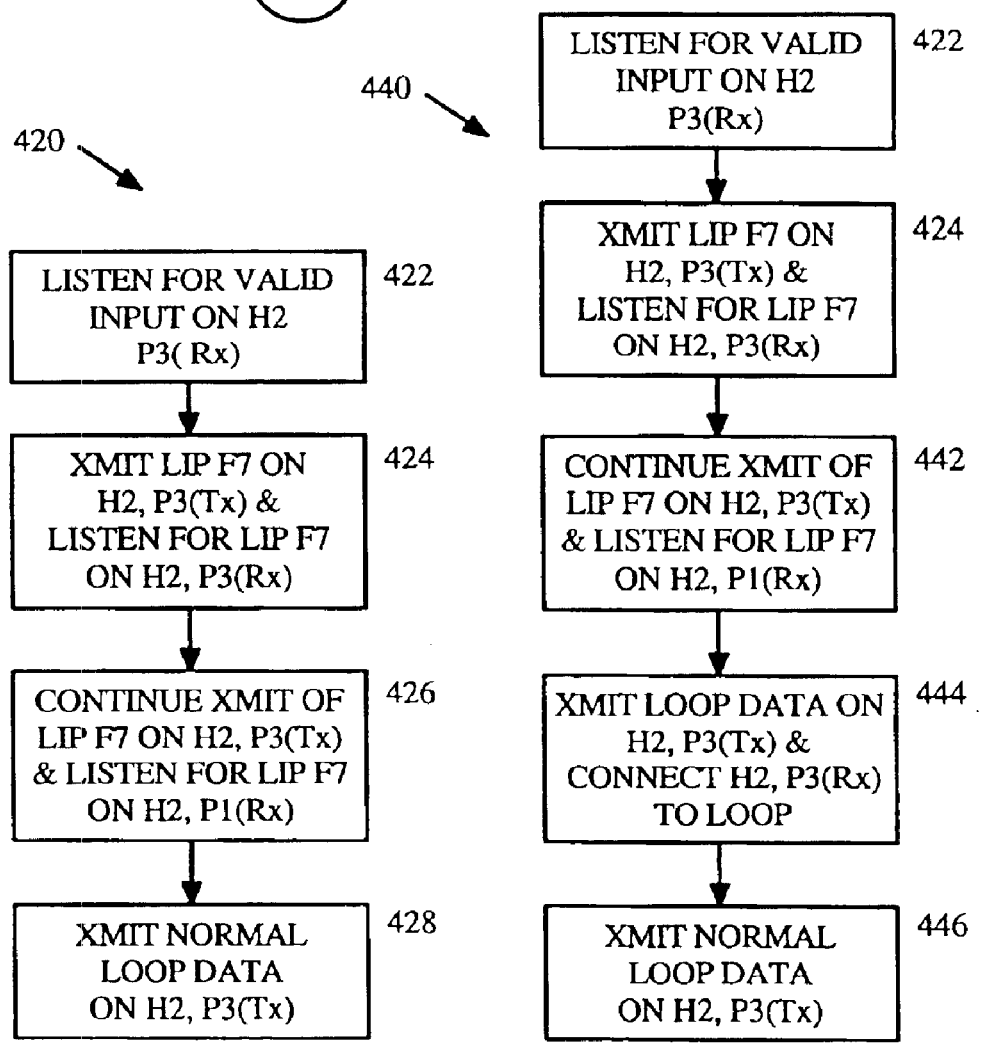
FIG. 21 is a flow diagram illustrating a first hot cascading method performed in accordance with the present invention on the system of FIG. 20.
FIG. 22 is a flow diagram illustrating a second hot cascading method performed in accordance with the present invention on the system of FIG. 20.
Figure 23:
FIG. 23 is a diagrammatic illustration of an integrated port control circuit manufactured in accordance with the present invention shown here to illustrate the pin out of the integrated circuit.

Referring to FIG. 21 in conjunction with FIG. 20, a first hot cascading method is generally indicated by the reference number 420. The basis of this method is to reset connection A from H2 prior to insertion and, hence, it may be referred to as a "reset connection" method. Method 420 begins with step 422 in which H2 listens for valid input on Rx of its P3. Thereafter, in step 424, LIP F7 is transmitted from Tx of P3 on H2. When the LIP F7 returns to H2 at P3(Rx), it is known that the remote H1 loop has returned the LIP, is operating properly and, therefore, is in a position to reset. Step 426 is then entered in which the LIP F7 continues to be transmitted from P3(Tx) of H2 while listening on P1(Rx) of H2 for the LIP F7 to return. Following return of the LIP F7, in step 428, the LIP is released on P3(Tx) of H2 and normal loop data is transmitted therefrom.

Referring to FIGS. 20 and 22, a second hot cascading method is generally indicated by the reference number 440. The basis of the second method is to reset H2 first and, hence, it may be referred to as a "self-reset" method. Method 440 begins with previously described steps 422 and 424. Following step 424, step 442 is performed in which LIP F7 is transmitted on P2(Tx) of H2 while listening for the LIP F7 at P1(Rx) of H2. As compared with method 420, in this instance, the LIP is transmitted upstream from the new connection (i.e., connection A) so as to reset H2 prior to H1. Thereafter, in step 444, loop data is transmitted on P3(Tx) of H2 with P3(Rx) of H2 connected into the loop. That is, the new connection is allowed in while transmitting the LIP F7. Following step 444, step 446 transmits normal loop data on P2(Tx) of H2.

Referring to FIG. 2, RDU 110 also utilizes methods for diagnosing system failures outside of hub 102. In a first detection feature, the ability to detect a CRC (Cyclic Redundancy Code) error is included so as to detect a data frame with a bit error entering the hub. In addition, because the RDU identifies the error to a hub port, the error domain is visible and the administrator therefore knows which connection to explore. Therefore, this feature is useful to a system administrator in determining if stations are introducing errors. In a second detection feature, the RDU also captures the source address (ALPA) of the bad data frame. The ALPA information combined with the port identification allows for further narrowing of the source of the error. Isolation of the error may be accomplished by identifying which ALPAs show errors and which do not. The boundary has a strong possibility of being the problem spot. In a third detection feature, invalid Fibre Channel Words are identified. This feature is useful in that invalid Fibre Channel Words are an indication of bit errors on a physical link both inside and outside data frames. An invalid word indication would occur if a bit error occurred between the last station and the RDU. This feature is useful if a fiber, transmitter or receiver is intermittent. It should be appreciated that all of these detection mechanisms can be collected and displayed in a persistent mode to allow capturing and displaying occurrences that are very low in frequency. A real time display would blink on and off so quickly as to be invisible to the administrator.

Using the specification to this point and FIGS. 2–22, it is considered that one of ordinary skill in the art may readily practice the present invention in view of the teachings therein. However, for further explanatory purposes, the various configurations and methods disclosed thus far will be described in more detail in conjunction with FIGS. 23–34. It is noted that the term Wizard refers to a hub manufactured in accordance with the present invention, while the terms Apprentice and Magician refer to management method configurations operating in accordance with the present invention. Immediately hereinafter, a description will be provided of an embodiment of a Port Control Integrated Circuit (PCC) manufactured in accordance with the present invention and suitable for use in PCC embodiments of the invention described above. Thereafter, documentation will be provided with regard to management including specific display provisions.

1.0 Purpose

The purpose of this description is to define the electrical, mechanical and environmental requirements for a Fiber Channel FC-AL Hub Integrated Circuit.

2.0 Scope

This description is limited to the definition of the requirements of the Integrated Circuit specified herein and to no other Integrated Circuit.

3.0 Applicable Documents/References

| | |
|---|---|
| ANSI X3.272 - 199x X3T11/Project 960D/ Rev. 4.5 | Fibre Channel Arbitrated Loop Interface (FC-AL) |
| TR ANSI X3.XXX - 199x Rev. 1.0 Draft F | Fibre Channel - Methodologies for Jitter Specification draft Proposed X3 Technical Report (Jitter Working Group) |

4.0 Electrical Requirements

TABLE 4.1

Absolute Maximum Ratings
(VEEE, VEET, VEEG, VEEP = GND)

| Symbol | Description | Min. | Typ. | Max. | Unit | Comment |
|---|---|---|---|---|---|---|
| Vcc | Power supply voltage | −0.3 | | 4 | V | |
| VI_T | TTL DC input voltage | −0.5 | | 5.5 | V | |
| VI_E | ECL DC input voltage | Vcc − 2 | | Vcc | V | |
| II_E | ECL input voltage between differential signal | −2 | | 2 | V | |
| IOH_T | TTL output current (High) | −20 | | 0 | mA | |
| IOL_T | TTL output current (Low) | 0 | | 20 | mA | |
| IO_E | ECL output current | −30 | | 0 | mA | |
| Ta | Ambient temperature | −55 | | 70 | C. | Under bias |
| Tstg | Storage temperature | −65 | | 150 | C. | |

TABLE 4.2

Recommended Operating Conditions

| Symbol | Description | Min. | Typ. | Max. | Unit | Comment |
|---|---|---|---|---|---|---|
| Vcc | Power supply voltage | 3.135 | 3.3 | 3.465 | V | 3.3 V + 5% |
| Ta | Ambient temperature | 0 | | 70 | C. | |

TABLE 4.3

DC Characteristics (over recommended operating conditions)

| Symbol | Description | Min. | Typ. | Max. | Unit | Condition |
|---|---|---|---|---|---|---|
| VIH_T | Input HIGH voltage (TTL) | 2 | | 5.5 | V | |
| VIL_T | Input LOW voltage (TTL) | 0 | | 0.8 | V | |
| IIH_T | Input HIGH current (TTL) | | | 20 | μA | Vin = Vcc |
| IIL_T | Input LOW current (TTL) | −400 | | | μA | Vin = 0 |

TABLE 4.3-continued

DC Characteristics (over recommended operating conditions)

| Symbol | Description | Min. | Typ. | Max. | Unit | Condition |
|---|---|---|---|---|---|---|
| VOH_T | Output HIGH voltage (TTL) | 2.2 | | Vcc | V | IOH = −0.4 mA |
| VOL_T | Output LOW voltage (TTL) | | | 0.5 | V | IOL = 2 mA |
| VIH_E | Input HIGH voltage (ECL) | Vcc − 1.17 | | Vcc − 0.88 | V | |
| VIL_E | Input LOW voltage (ECL) | Vcc − 1.81 | | Vcc − 1.48 | V | |
| VIS_E | Differential input voltage swing (ECL) | 200 | | 1000 | mV | AC coupled |
| VOH_E | Output HIGH voltage (ECL) | Vcc − 1.05 | | Vcc − 0.81 | V | 50 ohm to Vcc − 2 V |
| VOL_E | Output LOW voltage (ECL) | Vcc − 1.81 | | Vcc − 1.55 | V | 50 ohm to Vcc − 2 V |
| Icc | Supply current | | 123 | 154 | mA | Outputs open |
| Pd | Power dissipation | | 406 | 534 | mW | Outputs open |

TABLE 4.4

AC Characteristics (over recommended operating conditions)
See also FIG. 4.

| | Symbol | Description | Min | Typ. | Max. | Unit | Conditions |
|---|---|---|---|---|---|---|---|
| | Tir_RC | Input TTL rise time of REFCLK | | | 4.8 | ns | 0.8 V to 2.0 V |
| | Tif_RC | Input TTL fall time of REFCLK | | | 4.8 | ns | 2.0 V to 0.8 V |
| | Tor_T | Output TTL rise time | | | 3.5 | ns | 0.8 V to 2.0 V, CL = 10 pf |
| | Tof_T | Output TTL fall time | | | 3.5 | ns | 2.0 V to 0.8 V, CL = 10 pf |
| | Tor_E | Output ECL rise time | | | 400 | ps | 20% to 80%, CL = 2 pf |
| | Tof_E | Output ECL fall time | | | 400 | ps | 20% to 80%, CL = 2 pf |
| | SDR | Serial Data Rate | | 1062.5 | | MBd | 1.0 UI = 941 ps |
| | RC_TOL | REFCLK Frequency Tolerance | | | 100 | PPM | 53.125 MHz REFCLK |
| | RC_DC | REFCLK Duty Cycle Tolerance | | | 10 | % | |
| X | TJT | Total Jitter Tolerance, pk-pk, $10^{-12}$ BER | 0.7 | | | UI | TJT = FDJT + DJT + RJT |
| X | FDJT | Frequency Dependent Jitter Tolerance, pk-pk, $10^{-12}$ BER | 0.1 | | | UI | LPF R/2 = 62 ohm, C = 0.1 uf, Note 1 |
| X | DJT | Deterministic Jitter Tolerance, pk-pk, $10^{-12}$ BER | | | 0.38 | UI | LPF R/2 = 62 ohm, C = 0.1 uf, Note 1 |
| X | RJT | Random Jitter Tolerance, pk-pk, $10^{-12}$ BER | | | 0.22 | UI | LPF R/2 = 62 ohm, C = 0.1 uf, Note 1 |
| X | DJout | Deterministic Jitter Output, pk-pk | | 0.02 | 0.07 | UI | ± K28.5 serial data, 637 KHz HPF, LPF R/2 = 62 ohm, C = 0.1 uf |
| X | RJout | Random Jitter Output, rms | | 0.010 | 0.011 | UI rms | 00110011 serial data, 637 KHz HPF, LPF R/2 = 62 ohm, C = 0.1 uf |
| X | 8CRJout | Accumulated Random Jitter Output, rms 8 Cascaded ICs (Port_in to Loop_out) | | 0.011 | 0.0125 | UI rms | 00110011 serial data, 637 KHz HPF, LPF R/2 = 62 ohm, C = 0.1 uf |
| X | JXFR_PK | Jitter Transfer Peaking | | | 0.2 | dB | 00110011 Input, LPF R/2 = 62 ohm, C = 0.1 uf |
| X | JXFR_3dB | Jitter Transfer 3 dB Bandwidth | 650 | | 850 | KHz | 00110011 input, LPF R/2 = 62 ohm, C = 0.1 uf |
| X | Tbs | Bit Sync Time | | | 2500 | bit | FC IDLE Pattern |
| X | Tfa | Frequency Aquisition Time | | | 2000 | usec | LPF C = 0.1 uf |
| X | LDR | Lock Detect Range | −2 | | +2 | % | Frequency, Difference Between and Recovered Clock and Refclk |
| X | | PLL Lock Operation | | Auto | | | Note 2 |

Note 1: Fibre Channel Jitter Tolerance Mask from Jitter Working Group (see section 3.0).
Note 2: Autolock operation desired, but Jitter performance and Locking behavior is more important.

TABLE 4.5

Function of LOOP_OUT (see also FIG. 4)

| LOOP_SELN | LOOP_OUT |
|---|---|
| H | Recovered Data |
| L | LOOP_IN |

TABLE 4.6

Function of DIAG_OUT (see also FIG. 4)

| DIAG_SELN | DIAG_OUT |
|---|---|
| H | Recovered Data |
| L | DIAG_IN |

TABLE 4.7

Function of PORT_OUT (see also FIG. 4)

| PORT_SEL0N | PORT_SEL1N | PORT_OUT |
|---|---|---|
| H | H | Low |
| L | H | Recovered Data |
| H | L | DIAG_IN |
| L | L | LOOP_IN |

TABLE 4.8

Function of Recovered Data (see also FIG. 4)

| PORT_SEL0N | PORT_SEL1N | CDR_SELN | Recovered Data |
|---|---|---|---|
| H | H | H | Low |
| L | H | H | — |
| H | L | H | DIAG_IN |
| L | L | H | LOOP_IN |
| H | H | L | PORT_IN |
| L | H | L | PORT_IN |
| H | L | L | PORT_IN |
| L | L | L | PORT_IN |

4.9 Selection of Signal (Note: For Selection of Signal See Table 1 Above)
5.0 Mechanical Specifications

TABLE 5.2

Pin Type Definition

| Type | Definition |
|---|---|
| PS | Power supply or ground. |
| I_TTL | Input TTL |
| O_TTL | Output TTL |
| I_ECL | Input ECL |
| O_ECL | Output ECL |
| EX | External circuit node. |

6. GUI Requirements

The primary purpose of the GUI is to enable the user to easily configure and manage one or many stacks. This functionality breaks down into two general categories, multiple stack (device) management and problem (fault) detection and isolation. The device management is focused on viewing the status and controlling physical devices and fault management is focused on viewing the current state of a loop and the connections to it. In managing the stacks there is a natural hierarchy: stacks, mgmt, hubs, ports. In problem detection and isolation information for loop states the hierarchy is: loops, mgmt, hubs, ports. The GUI will present these "cuts" or views into the data.

The overall requirements of the GUI are:
 GUI must be intuitive, easy to use, and useful
  Help system
 Multiple Stack device management—ability to view ID, status and controls for any manageable item

| | 5.1 Pin Description (see also FIG. 4) | | | |
|---|---|---|---|---|
| | Name | Pin No. | Type | Description |
| X | REFCLK | 1 | I_TTL | Reference Clock: When LKREFN is Low or CDR input frequence Is unlocked, PLL locks to REFCLK |
| | LKDT | 2 | O_TTL | PLL Lock Detector: When PLL doesn't lock, it is Low |
| | VEET | 3 | PS | Ground for TTL I/O: 0 V. |
| | DIAG_IN | 4 | I_ECL (Diff) | Serial data output. (See FIG. 1). |
| | DIAG_INN | 5 | | |
| | VCCE | 6 | PS | Power Supply for ECL I/O: 3.3 V ± 5% |
| | LOOP_IN | 7 | I_ECL (Diff) | Serial data input. (See FIG. 1). |
| | LOOP_INN | 8 | | |
| | VEEG | 9 | PS | Ground for internal logic gate: 0 V. |
| | PORT_IN | 10 | I_ECL (Diff) | Serial data input. (See FIG. 1). |
| | PORT_INN | 11 | | |
| | LKREFN | 12 | I_TTL | Lock to Reference. An active Low input, LKREFN Causes the PLL lock to the REFCLK |
| | VEEP | 13 | PS | Ground for PLL: 0 V. |
| | LPF1 | 14 | EX | Connect to external Loop Filter. |
| | LPF2 | 15 | EX | Connect to external Loop Filter. |
| | VCCP | 16 | PS | Power supply for PLL: 3.3 V ± 5%. |
| | PORT_SEL1N | 17 | I_TTL | Selection for PORT_OUT. (See Table 1) |
| | PORT_SEL0N | 18 | | |
| | VEEE | 19 | PS | Ground for ECL I/O: 0 V. |
| | PORT_OUTN | 20 | O_ECL (Diff) | Serial data output. (See FIG. 1). |
| | PORT_OUT | 21 | | |
| | VCCE | 22 | PS | Power supply for ECL I/O: 3.3 V ± 5%. |
| | LOOP_OUTN | 23 | O_ECL (Diff) | Serial data output. (See FIG. 1). |
| | LOOP_OUT | 24 | | |
| | VCCG | 25 | PS | Power supply for internal logic gates: 3.3 V ± 5%. |
| | DIAG_INN | 26 | I_ECL (Diff) | Serial data input. (See FIG. 1). |
| | DIAG_IN | 27 | | |
| | LOOP-SELN | 28 | I_TTL | Selection for LOOP_OUT. (See Table 1). |
| | DIAG_SELN | 29 | I_TTL | Selection for DIAG_OUT. (See Table 1). |
| | CDR_SELN | 30 | I_TTL | When Low, PORT_IN is selected for CDR. |

Notes:
See FIG. 23 which illustrates an integrated port control circuit manufactured in accordance with the present invention and generally indicated by the reference number 460.
X left of table indicates that this is different or not included in preliminary spec.

Site view
Single stack view
Mgmt view
Hub view
Port view
Problem detection and isolation—ability to view how stacks and loops are connected and health information
Site view
Single loop view
Mgmt view
Hub view
Port view
Must provide an Ethernet SNMP interface
Must be localizable
Must interface with Apprentice
Must provide event logging

6.1 Site View

This view will present all active Mgmt cards and all loops associated with each card which will give the user a one screen presentation of the health of all managed stacks and their loops. Since, each managed stack must contain at least one management card and only one card can be active within a management stack, the highest level view will present the active card within each stack and each card presented in this view will be indicative of the worst state of the corresponding stack of hubs. In the same respect, the loops displayed will be presented in a way to reflect their current state (active, should investigate, down). The user needs the ability to display and modify identifying information for both stacks and loops.

The requirements for this view are:
Display all manageable/monitorable items
  stacks
  loops
Identification of all manageable stacks by active mgmt card
  IP
  MAC
  domain name
  user supplied name
Show worst case state (active, should investigate, down) of all manageable stacks
Indicate number of hubs in each stack
Ability to drill-down on any active Mgmt card for more information on the stack
Show monitorable loops in each stack
Identification of all monitorable loops
  user supplied name
Show current state (active, should investigate, down) of all monitorable loops
Indicate number of nodes on loop
Ability to drill-down on any loop for more loop information
Some future requirements are:
Indicate primary In-band management links
  NOT just using thickness of connection
Indicate secondary In-band management links
Display In-band Magician management stations
Future devices

6.2 Single Stack View

This view will show all the hubs in a selected stack but will not necessarily reflect the physical ordering of the hubs. This logical stack configuration will show any cascaded hubs and their associated ports within the stack. Cascading of the hubs allows multiple hubs access to the same loop and within a stack of hubs, it is possible to have one or more loops configured in the stack. Each port on a hub can be attached to a node, a loop of nodes such as a JBOD, or an unmanaged hub.

The requirements for this view are:
Display manageable hubs in stack selected
Indicate which hub has the active Mgmt card
Show worst case state of ports for each displayed hub
Display identification of each hub
  serial #
Indicate presence of Mgmt card in any hub, active or slave
Display identification of all Mgmt cards present
  MAC
  IP
  user supplied name
Show hub cascades
Indicate connections outside of managed stack
  If another hub, allow drill-down of stack
  Clouds=other things with >1 ALPA

6.3 Loop View

Within a loop, it is possible to have one or more stacks configured in the loop. Each port on a hub can be used to attach another hub, cascaded, into a single loop or each hub can be its own isolated loop or any other combination of hub connections as long as there is no more than one loop per hub. Each port on a hub can also be attached to an unmanaged device such as a JBOD. This view will show the logical managed loop topology of the selected loop.

The requirements for this view are:
Show all manageable\known? items in loop selected
  hubs
  clouds=JBOD, rest of loop, other things with >1 ALPA
  label unmanaged hub cloud?
Indicate which hub has the active Mgmt card
Show worst case state of ports for each displayed hub
Display identification of each hub
  serial #
Indicate presence of Mgmt card in any hub, active or slave
Display identification of all Mgmt cards present
  MAC
  IP
  name
Display any loop info available
  throughput
  # of link up/link down
  # of ARBs
  registration
Display node info per port
  ALPA list
  user supplied name
  user supplied WWN
  user supplied device type
  user supplied manufacturer
  user supplied location

6.4 MGMT Card View

This view should give all pertinent info for a selected management card and provide mechanisms to modify the configuration of the selected Mgmt card.

The requirements for this view are:
Display Mgmt card identification information
  MAC
  IP
  HW revision
  FW revision Indicate state of Mgmt card
Allow user to force this Mgmt card to be active

6.5 HUB View

This view will provide status and control information about each hub in a managed stack or loop and will provide mechanisms to modify the configuration of each hub.

The requirements for this view are:

Display manageable hub features intuitively
Indicate port status of all ports using color
Show LED states and interpret
  port
  management
    management card present
    management card OK
    management card master
    Ethernet activity
  enclosure monitoring/system
    power supply status
    loop up
    enclosure fault
    uC fault
Display type of GBIC or none per port
Display Mgmt card if present and identify
  MAC
  IP
  name
Display serial # of hub
Allow multiple port views to be displayed
Display node info per port
  ALPA list
  user supplied name
  user supplied WWN
  user supplied device type
  user supplied manufacturer
  user supplied location

6.6 Port View

This view will allow the user to access all manageable features at the port level.

The requirements for this view are:

port control
  enable auto insert/bypass if detect fault—loss of signal, loss of lock or transmitter fault (default)
  OR
  force loop bypass
  force external loopback, will force loop bypass
  OR
  force insertion on loop
port status
  port control state
    enable auto insert/bypass
    force bypass
    external loopback
    force insert into loop
  port module ID copper/fiber(SW,LW) 3 bit GBIC spec id.

TABLE 6.6-1

| Bits 2:0 | Definition |
|---|---|
| 111 | No Module Present |
| 110 | Copper Module, DB-9 Connector |
| 101 | Copper Module, HSSDC Connector |
| 100 | Long-wave Laser |
| 011 | Serial Interface Protocol |
| 010 | Short-wave Laser |

TABLE 6.6-1-continued

| Bits 2:0 | Definition |
|---|---|
| 001 | To Be Defined |
| 000 | Gigabit Ethernet | port active = signal detected

TABLE 6.6-2

| Logic Inputs | | | | GBIC | |
|---|---|---|---|---|---|
| Mod_Pres | TX_Fault | Rx_signal | Status Green | Link_Flt Amber | Description |
| F | X | X | OFF | OFF | Module not inserted |
| T | T | X | OFF | ON | Faulty Module |
| T | F | F | ON | ON | Module OK; Missing or Corrupt Data |
| T | F | T | ON | OFF | Normal Operation | port state (loop inserted, bypassed, stuck in PLL)
type of port connection, hub/node attached

7. GUI Design

The goal of the GUI is to present this functionality in an intuitive and user-friendly package. The primary techniques that will be employed in accomplishing this goal are:

a hierarchical presentation with drill-down capabilities starting with the stack manager at the highest level and drilling down to the individual port level
  logical topologies using icons that are easily identifiable
  color coding to indicate health for quick problem detection and isolation
    gray=unused
    green=everything is functional
    yellow=needs attention (should be investigated)
    red=failure
  user labeling of all devices
  readily available "how-to use this window" information
  a consistent window interface
    flyover with high-level info on item
    single click=more detailed info on item
    double click=drill-down if available
    a "How to use this window" button
    a "Text/GUI" display toggle button
  comprehensive Help system
  cursor indication of selectable items The major design divisions in the application are as follows:

Views
Data Objects
Data Acquirement
Health Determination
Management API
Mgmt API/SNMP mapping wrappers
SNMP Interface
Internationalization/Localizability
Event Log

7.1 Views

There are natural partitions in the information we want to present. The device management is focused on physical devices and the problem detection and isolation is focused on the current state of a loop and the connections to it. In presenting the manageable stacks there is a natural hierarchy: stacks, Mgmt cards, hubs, ports. In presenting information for loop states the hierarchy is: loops, Mgmt cards, hubs, ports.

Figure 24:
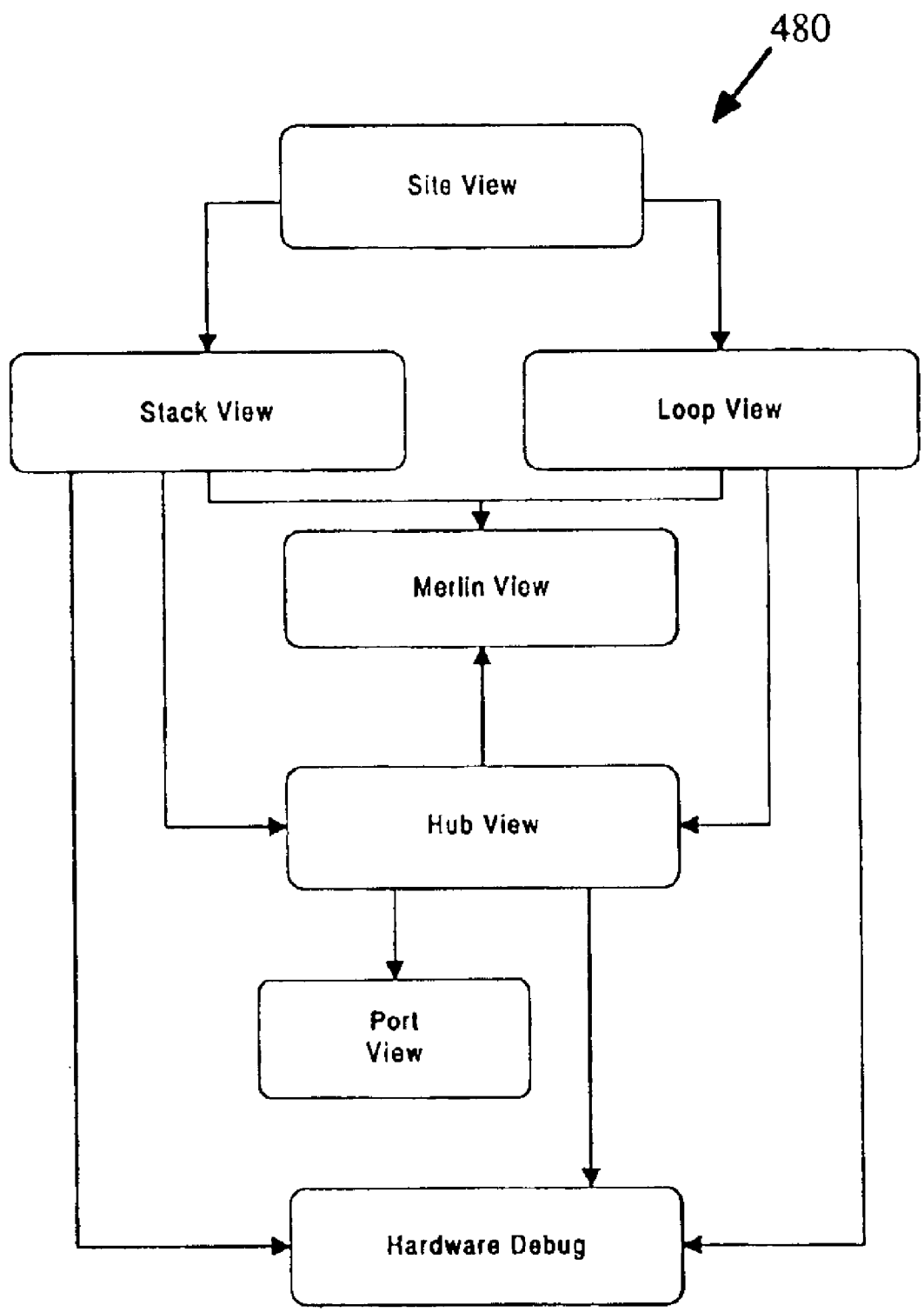
FIG. 24 is a diagram illustrating the hierarchical presentation of display views used by the present invention.

The proposed hierarchical presentation will drill-down as follows:

Site view—all manageable stacks and loops
      Single Stack view
         Mgmt card view
         Back of box view
            Mgmt card view
            Port detail view
            Hardware debug view
      Loop view
         Mgmt card view
         Back of box view
            Mgmt card view
            Port detail view
            Hardware debug view The hierarchical presentation will drill-down graphically, as depicted in FIG. 24 by a diagram that is generally indicated by the reference number 480. Magician will display status and control information about each hub in a managed stack or loop by clicking on a hub from the Stack View (see FIG. 11) or Loop view (see FIG. 25) and will provide mechanisms to modify the configuration of each hub.

A polling or change mechanism will be required to keep the views in sync with the data. For Apprentice, a simple redraw of objects will be used. It still needs to be determined the extent of change management that should be implemented for Magician.

7.1.3 Loop View

Figure 25:
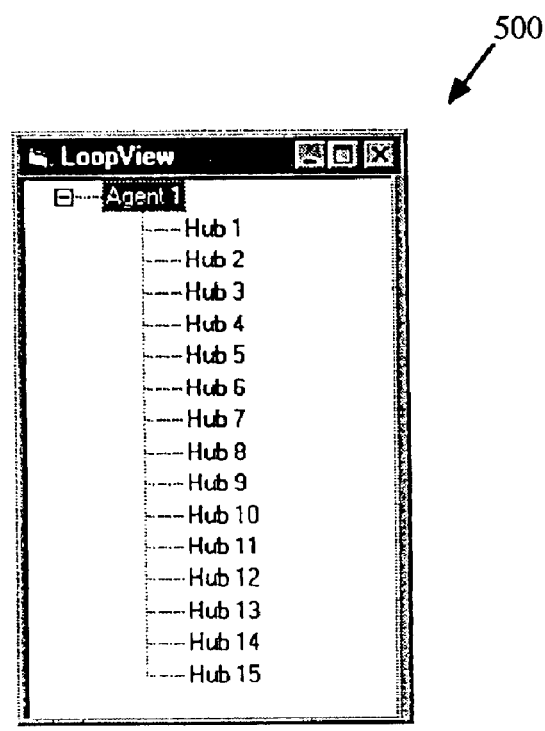
FIG. 25 is a display view showing a Loop View having a tree type structure.

Referring to FIG. 25, a Loop View is generally indicated by the reference number 500. The Loop View will be a tree structure type view. It is intended that the user will be able to "build their own loops" by dragging and dropping hubs into a loop root.

7.1.4 Hub View

Figure 26:
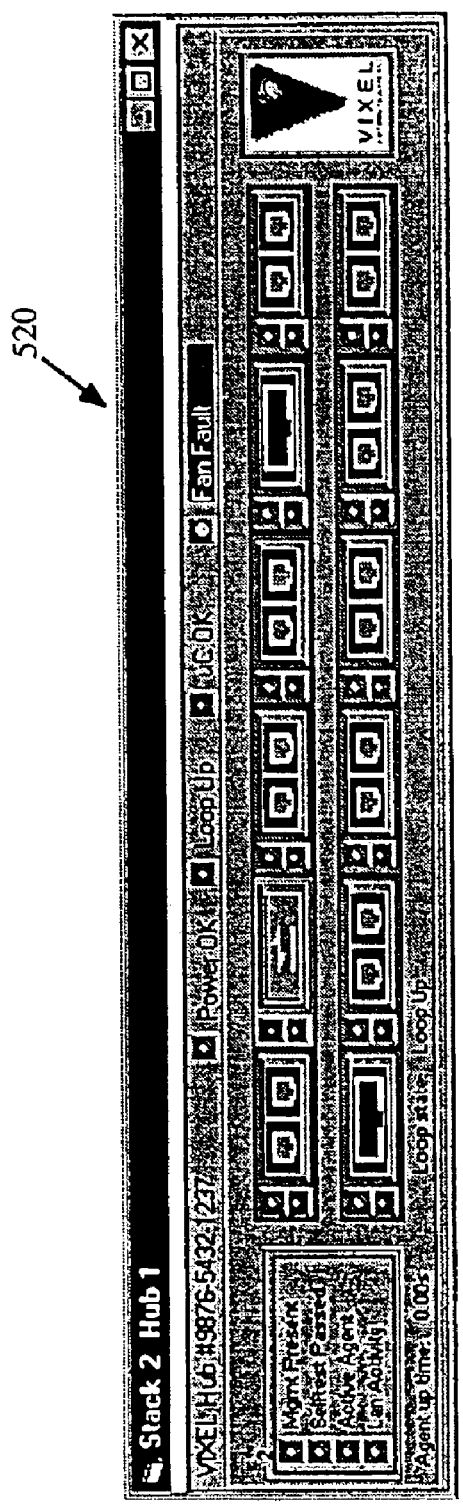
FIG. 26 illustrates a display similar to the display depicted by FIG. 12, however, a Hub View corresponding to Stack 2, Hub 1 is shown.
Figure 27:
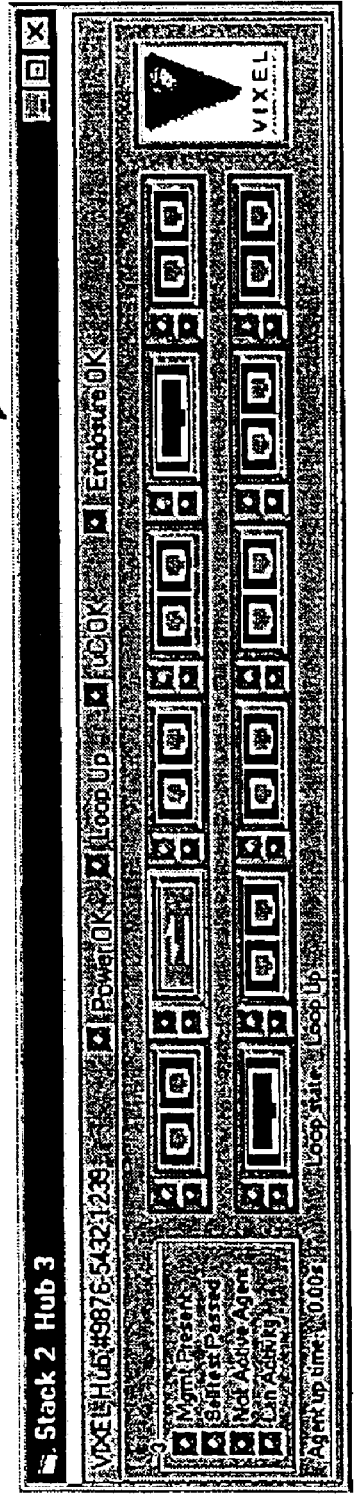
FIG. 27 illustrates a display similar to the display depicted by FIG. 12, however, a Hub View corresponding to Stack 2, Hub 3 is shown.

FIG. 26 is similar to previously described FIG. 12, however, FIG. 26 illustrates another Hub View for Stack 2, Hub 1 generally indicated by the reference number 520. FIG. 27 illustrates still another Hub View for Stack 2, Hub 3 generally indicated by the reference number 540.

7.1.5 Mgmt View

FIG. 28 illustrates a management view generally indicated by the reference number 560.

7.1.7 Hardware Debug

Figure 29:
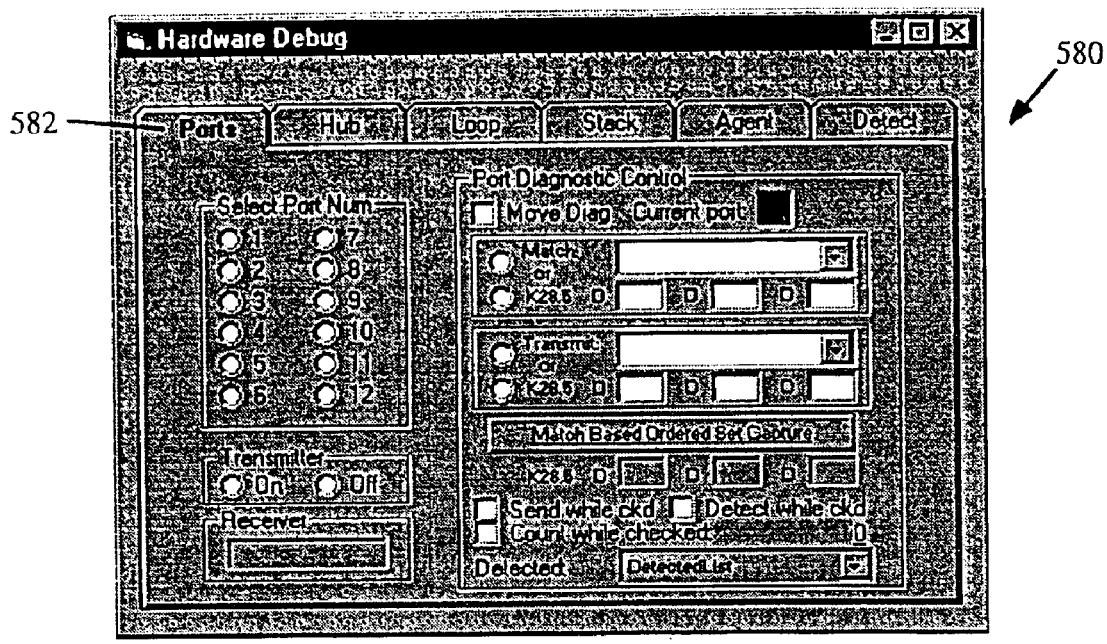
FIG. 29 illustrates the display of a hardware debug view for use in system diagnosis in accordance with the present invention shown here to illustrate the appearance of a "Ports" tab screen.

FIG. 29 illustrates a first hardware debug view which is generally indicated by the reference number 580. In this view, a "Ports" tab 582 has been selected.

Figure 30:
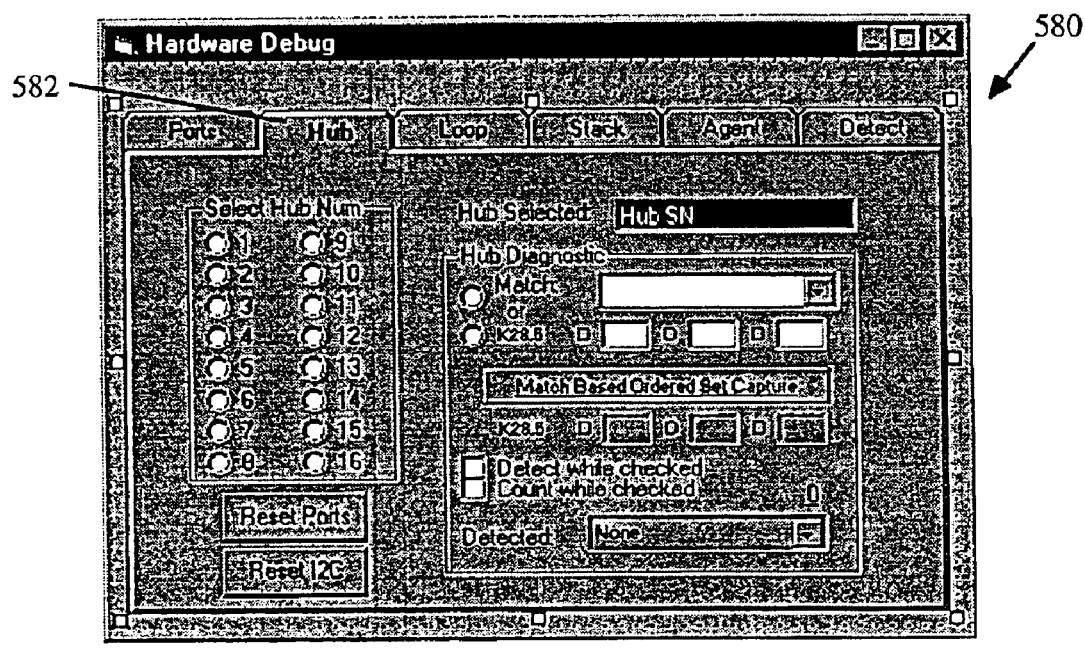
FIG. 30 illustrates the display of the hardware debug view of FIG. 29, however, a "Hub" tab has been selected illustrating the appearance of the Hub tab screen.

FIG. 30 illustrates hardware debug view 580 with a "Hub" tab 584 selected.

Figure 31:
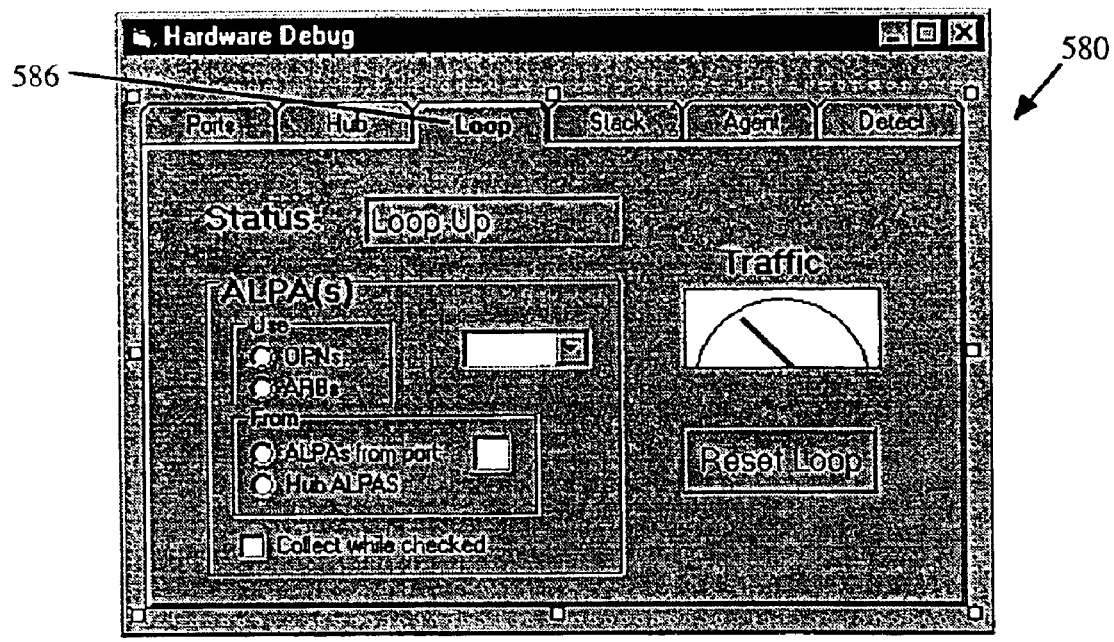
FIG. 31 illustrates the display of the hardware debug view of FIG. 29, however, a "Loop" tab has been selected illustrating the appearance of the Loop tab screen.

FIG. 31 illustrates hardware debug view 580 with a "Loop" tab 586 selected.

Figure 32:
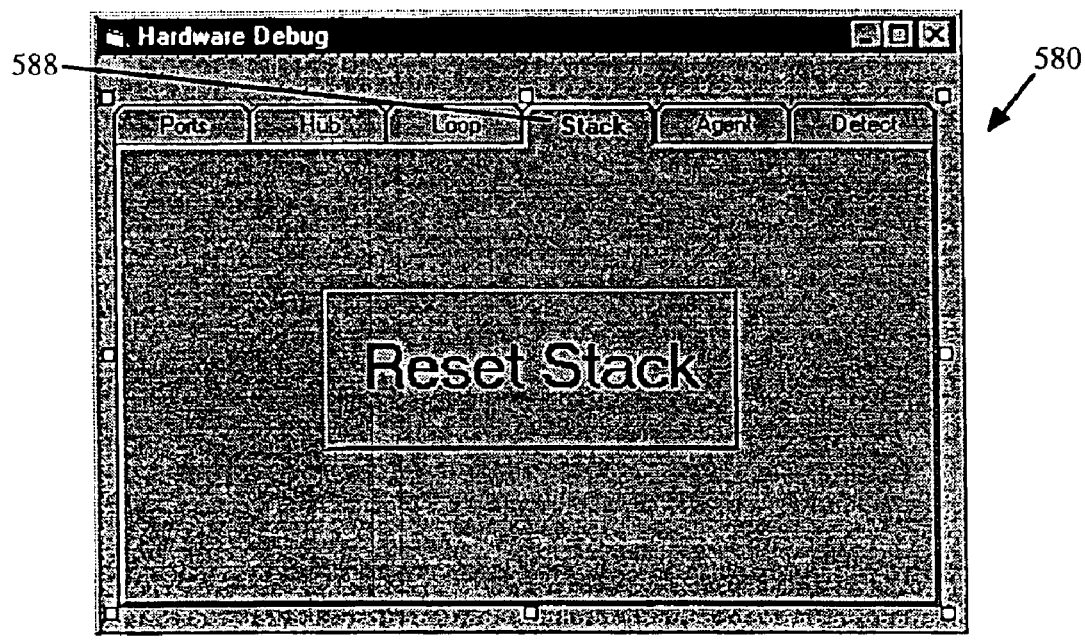
FIG. 32 illustrates the display of the hardware debug view of FIG. 29, however, a "Stack" tab has been selected illustrating the appearance of the Stack tab screen.

FIG. 32 illustrates hardware debug view 580 with a "Stack" tab 586 selected.

Figure 33:
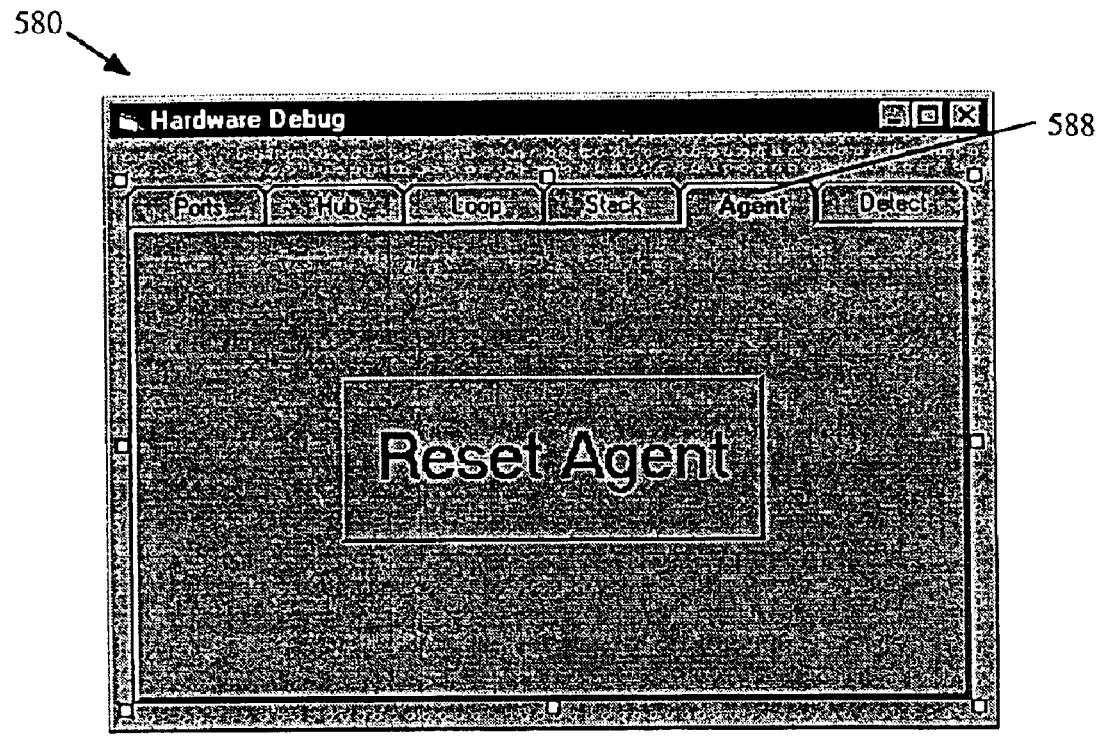
FIG. 33 illustrates the display of the hardware debug view of FIG. 29, however, an "Agent" tab has been selected illustrating the appearance of the Agent tab screen.

FIG. 33 illustrates hardware debug view 580 with an "Agent" tab 588 selected.

It is noted that the "Detect" tab in FIGS. 29–33 has been replaced by a "Sweep" tab having the same functionality. Selection of this sweep tab brings up Hub Sweep View 260 of FIG. 14, described above.

7.2 Data Objects

Figure 34:
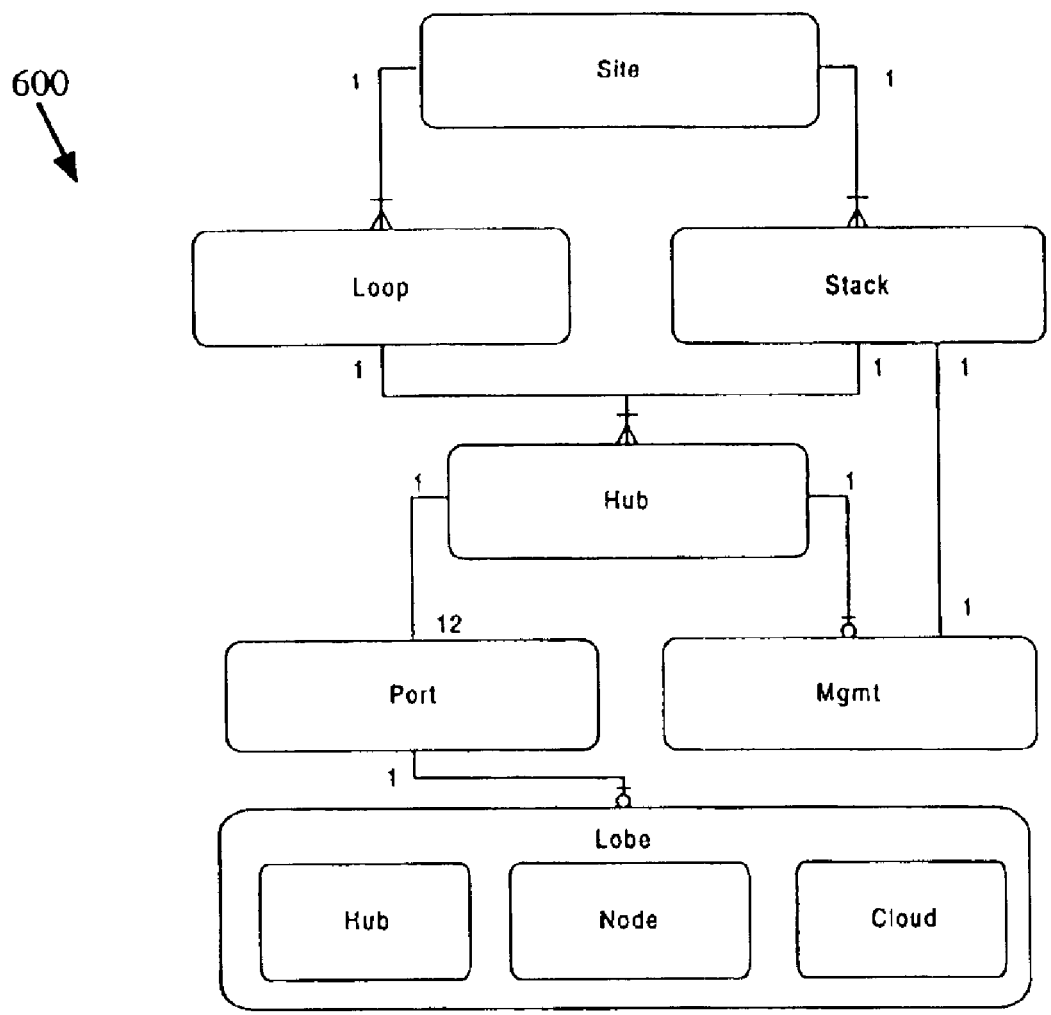
FIG. 34 is a chart illustrating the data object composition of objects as used by the present invention.

There is also a natural hierarchy of objects in the system we will be handling. The primary objects identified are:

lobes: loop nodes, hubs, clouds ports mgmt cards hubs stacks=active mgmt cards loops site Referring to FIG. 34, a data object composition chart is generally indicated by the reference number 600. Each object identified has state and control information associated with it. The state information maps into Visual Basic properties and the controls map into Visual Basic methods as follows:

Cloud
      Properties[val Types]
         ALPAs
         Graphic
   Node
      Properties[val Types]
         Name
         WWW
         Location
         DeviceType
         Manufacturer
         Graphic
   Lobe
      Properties[val Types]
         Length
         Type [none, unknown, node, hub]
         ID
         ConnectObject
   Port
      Properties[val Types]
         ControlState[auto, bypass, extloopback, insert]
         BeaconState [Boolean]
         TransmitterState [Boolean]
         ModuleID [GbEther, TBD, LaserSW, Serial, LaserLW,
            CopperHSSDC, CopperD9, NoModule]
         GBICLED [Boolean]
         FaultLED [On, Off, Blink]
         State [inserted, bypassed, TxFault]
         PllLock[True, False]
         LobeObject
         Utilization
         FailoverPort
         TimesInserted
         Health
         DeviceID
         Graphic
      Methods(args)
         Beacon (Boolean)
         Control (Auto, Bypass, Loopback, Insert)
         Transmitter (Boolean)
         FailoverPortSet
         UpdateInfo
         GetHealth
         SetVars(deviceID, vars, vals)
         RecvVars(deviceID, vars, vals)
         Class_Initialize
   Mgmt
      Properties[val Types]
         State [active, passive, maintenance, unknown]
         FailoverPriority[0 7]
         MAC
         IP
         SelftestOK [Boolean]
         HardwareVersion
         FirmwareVersion
         LanActivity [Boolean]
         EventLog Password
SyslogHost
Name
Health
DeviceID
Graphic
Methods(args)
FailoverPrioritySet
PasswordSet
IpSet
ForceActive
EventFilter
SyslogHostSet
Reset
UpdateInfo
GetHealth
SetVars(deviceID, vars, vals)
RecvVars(deviceID, vars, vals)
Class_Initialize
Hub
  Properties[val Types]
  FanFault [Boolean]
  TempFault [Boolean]
  PowerFault [Boolean]
  uCFault [Boolean]
  SerialNumber
  Family
  HWType
  NumPorts
  FWVersion
  ManagementPresent [Boolean]
  DiagPort
  PortsObject
  MgmtObject
  LoopObject
  Health
  DeviceID
  Graphic
  Methods(args)
  DiagnosPort
  Reset(I2C, ports)
  UpdateInfo
  GetHealth
  SetVars(deviceID, vars, vals)
  RecvVars(deviceID, vars, vals)
  Class_Initialize
Loop
  Properties[val Types]
  ID
  State [initializing, open-init, loop up, loop active]
  ALPAs
  UpTime
  TimesReset
  Utilization
  HubsObject
  Health
  DeviceID
  Graphic
  Methods(args)
  Reset
  UpdateInfo
  GetHealth
  SetVars(deviceID, vars, vals)
  RecvVars(deviceID, vars, vals)
  Class_Initialize
Stack
  Properties[val Types]
  ID
  HubsObject
  LoopsObject
  Health
  DeviceID
  Graphic
  Methods(args)
  Reset
  UpdateInfo
  GetHealth
  SetVars(deviceID, vars, vals)
  RecvVars(deviceID, vars, vals)
  Class_Initialize
Site
  Properties[val Types]
  Evendog
  AgentsObject
  StacksObject
  Icon
  Health
  DeviceID
  Graphic
  Methods(args)
  UpdateInfo
  GetHealth
  SetVars(deviceID, vars, vals)
  RecvVars(deviceID, vars, vals)
  Class_Initialize 7.3 Data Acquisition A polling mechanism will be employed to obtain current relevant information, which will update the information available for each object. The attributes of the poll mechanism are:

Poll Interval
  1 min=Default
  This should be user adjustable.
Amount of data acquired:
  Apprentice only requires a simple "poll all" mechanism,
  Magician might need a more intelligent poll using the event log as a back-off mechanism due to too high of IP loading for a complete data poll on every poll interval. The back-off mechanism will be further defined when the event log definition is stable. The preliminary algorithm concept is:
  request active mgmt ID info from all communicating mgmt cards (active or passive)=
  request ALL info from active mgmt cards active mgmt= stack
  poll event logs from all active mgmt cards
  if change in event log get pertinent data
  Another option for minimizing the impact of the poll mechanism is to break requests into chunks instead of requesting all data at once.
Type of poll
  Apprentice will have a blocking poll
  Magician will have an asynchronous poll provided by the PowerTCP SNMP package The functionality will be implemented by using Timer objects. The ability to refresh object information will be provided consistently and generically by each object having its own UpdateInfo method.

7.4 Health Determination

Here is the color coding map to indicate health for problem detection and isolation gray=Unused
green=everything is Functional
yellow=needs Attention (should be investigated)
red=Failure
Each of the following objects will have a health indicator that will have an affect on the next level object above it.
ports
  Unused
    Default
  Functional
    GBICLED=on & FaultLED=off
  Attention
    ControlState !=auto
    State=bypassed
  Failure
    ModuleID !=NoModule & GBICLED=off
    TransmitterState=off
    FaultLED=on
    ControlState=insert & State !=inserted
mgmt (must be present)
  Unused
    State=passive
  Functional
    State=active & SelftestOK=true & LanActivity=true
  Attention
    State=maintenance
    State !=active & LanActivity=false
  Failure
    State=unknown
    SelftestOK=false
    State=active & LanActivity=false
hubs
  Unused
    Never
  Functional
    Default
  Attention
    mgmt.health =attention|ports.health=attention
  Failure
    mgmt.health=failure|port.health=failure
    FanFault=true
    TempFault=true
    PowerFault=true
    uCFault=true
loops
  Unused
    Never
  Functional
  Attention
  Failure
    State !=loopUp|loopActive
stacks
  Unused
    Never
  Functional
    Default
  Attention
    hubs.health=attention
  Failure
    hubs.health=failure
site
  Unused
    Never
  Functional
    Default
  Attention
    hubs.health=attention|loops.health=attention
  Failure
    hubs.health=failure|loops.health=failure This functionality will be consistently and generically implemented by each object having its own GetHealth method.

One skilled in the art may devise many alternative configurations for the systems and methods disclosed herein. Therefore, it should be understood that the present invention may be embodied in many other specific forms without departing from the spirit or scope of the invention and that the present examples and methods are to be considered as illustrative and not restrictive, and the invention is not to be limited to the details given herein, but may be modified within the scope of the appended claims.

What is claimed is:

1. In a Fibre channel system configured for interconnection of a plurality of stations using a main loop as part of a digital system such that digital data including ordered sets flows between the stations on the main loop based on operational status of the system, said stations being interconnected by a hub which partially defines said main loop, a management arrangement comprising:

a) monitoring means couplable to the main loop and coupled to a diagnostics loop separate from the main loop for carrying a copy of the digital data, the monitoring means forming one part of said hub for non-invasively monitoring a plurality of points distributed on said main loop between pairs of said stations that are adjacent to one another with respect to said main loop for the presence at said points of one of a number of predetermined types of ordered sets, which predetermined ordered set types are indicative of the operational status of the stations and of the hub; and b) analysis means couplable to the diagnostics loop and forming another part of said hub for establishing at least one status indication based on the presence of said predetermined ordered set types at one or more of said points.

2. The management arrangement according to claim 1 wherein said status indication is selected from an array of loop states ranging from non-operational to fully operational and said management arrangement includes control means for responding to said status indication in a way which alters the overall configuration of the main loop to move the operational status of the system more toward fully operational when the status indication is within a predetermined range from non-operational in said array of loop states.

3. The management arrangement according to claim 1 wherein said status indication is an overall health indication of the condition of said main loop based upon the predetermined ordered set type that is present at each of said points.

4. The management arrangement according to claim 1 wherein the status indication is selected from a group of loop states including INOPERATIVE, INITIALIZING, OPEN-INIT, UP and UP+FRAME.

5. The management arrangement according to claim 4 including display means wherein said main loop is represented visually in at least one view as an icon on said display means and wherein said icon includes one of a number of different colors which denote said status indication.

6. The management arrangement according to claim 5 wherein each station is physically connected to one of a number of ports, respectively, on said hub and wherein said analysis means is configured for generating additional status indications such that each port has an associated additional status indication and said display means is further configured such that selection of said icon leads to a hub view which is physically representative of said hub including said ports and said display means uses said different colors in association with said ports in a way which indicates the additional status indication associated with each port.

7. The management arrangement according to claim 6 wherein selection of one of said ports as represented on said display means leads to an additional view on the display means which includes specific information related to the selected port and to any station connected with the selected port.

8. The management arrangement according to claim 7 including control means forming part of said hub and having a series of user selectable port control modes such that any port may be placed in one of the control modes and wherein said specific information includes an indication of the port control mode currently selected for the selected port.

9. The management arrangement according to claim 8 wherein said stations are selectively connectable with said main loop using said port control modes and wherein said port control modes include an automatic mode in which each station is connected to the main loop based on certain criteria.

10. The management arrangement according to claim 8 wherein said stations are selectively connectable with said main loop using said port control modes and wherein said port control modes include a forced bypass mode in which any station inserted into any port in forced bypass mode is disconnected from the main loop.

11. The management arrangement according to claim 8 wherein said stations are selectively connectable with said main loop using said port control modes and wherein said port control modes include a loop-back mode such that digital data transmitted from a particular station connected to a port in loop-back mode is returned to that particular station without being transmitted to other stations on the main loop.

12. The management arrangement according to claim 8 wherein said stations are selectively connectable with said main loop using said port control modes and wherein said port control modes include a forced insert mode such that a particular station connected to a port in forced insert mode is always connected to the main loop.

13. The management arrangement according to claim 8 wherein each station is connected to a respective one of the ports using a gigabit interface converter (GBIC) inserted into the port, each GBIC being selected from one of a number of possible GBIC types and each GBIC including readable information identifying its type out of the number of possible GBIC types and wherein the management arrangement includes means for reading the readable information from the GBIC and for providing said readable information as part of said specific information.

14. The management arrangement according to claim 6 including control means forming part of said hub and configured such that any port may be beaconed in a predetermined way and wherein selection of one of said ports as represented on said display means leads to a port view on the display means which includes means for causing the selected port to be beaconed.

15. The management arrangement according to claim 14 wherein said additional view includes a beacon port selection box for causing the selected port to be beaconed.

16. The management arrangement according to claim 14 wherein said beaconing of the selected port is visible in the hub view in a way which directs a viewer's attention to the selected port.

17. The management arrangement according to claim 14 wherein the selected port is beaconed in said predetermined way using beaconing means located physically adjacent to the selected port on said hub.

18. The management arrangement according to claim 14 wherein said beaconing means includes a light emitting arrangement adjacent to the selected port on said hub which flashes at a selected interval when the selected port is beaconed.

19. The management arrangement according to claim 1 further comprising:

c) display means for simultaneously displaying the predetermined ordered set type which is present at each one of said points so as to enable an operator of the system to make determinations as to an individual status of each one of the stations.

20. The management arrangement according to claim 19 wherein the predetermined ordered set types include LIP, LIP F7, LIP F8, OPN, ARB, SOF, USR and IDLE.

21. In a Fibre channel system configured for interconnection of a plurality of stations using a main loop as part of a digital system such that digital data including ordered sets flows between the stations on the main loop based on operational status of the system, said stations being interconnected by a hub which partially defines said main loop, a method comprising the steps of:

a) non-invasively monitoring a plurality of points distributed on said main loop between pairs of said stations that are adjacent to one another with respect to said main loop for the presence of one of a number of predetermined types of ordered sets utilizing a diagnostics loop separate from the main loop for carrying a copy of the digital data, which predetermined ordered set types are indicative of the operational status of the stations and of the main loop; and b) establishing at least one status indication based on the presence of said predetermined ordered set types at one or more of said points.

22. The method according to claim 21 wherein said status indication is selected from an array of loop states ranging from non-operational to fully operational and said method includes the step of responding to said status indication in a way which alters the overall configuration of the main loop to move the operational status of the system more toward fully operational when the status indication is within a predetermined range from non-operational in said array of loop states.

23. The method according to claim 21 wherein said status indication is an overall health indication of the condition of said main loop based upon the predetermined ordered set type that is present at each of said points.

24. The method according to claim 23 wherein the status indication is selected from a group of loop states including INOPERATIVE, INITIALIZING, OPEN-INIT, UP and UP+FRAME.

25. The method according to claim 21 including the step of visually displaying said main loop as an icon including one of a number of different colors which denote said status indication.

26. The method according to claim 21 including the step of simultaneously displaying the predetermined ordered set type which is present at each one of said points so as to enable an operator of the system to make determinations as to an individual status of each one of the stations.

27. In a Fibre Channel system configured for interconnection of a plurality of stations as part of a digital system using a main loop such that digital data flows between the stations on the main loop through a hub, said hub being configured for interconnection of said stations using a series of ports interfaced with said main loop such that one or more stations are connected to each port to form a lobe of the main loop, a method of verifying the integrity of a selected one of said lobes including the station or stations in the selected lobe, said method comprising the steps of:

a) configuring said hub for entering a lobe test mode, the configuration of said hub including forming a diagnostics loop separate from the main loop for carrying a copy of the digital data such that any digital data transmitted to the hub from the station or stations on the selected lobe in the lobe test mode is returned to the selected lobe;

b) placing the selected lobe into the lobe test mode while digital data present on the main loop continues to flow thereon; and c) thereafter, in the hub, listening on the selected lobe for a predetermined initialization sequence on the selected lobe without affecting digital data flowing on the main loop.

28. The method according to claim 27 further comprising the step of:

d) providing an indication as to the integrity of the selected lobe based upon detection of the predetermined initialization sequence on the selected lobe.

29. The method according to claim 28 wherein the selected initialization sequence is detected by the sequence of ordered sets including LIP, ARB, CLS and SOF.

* * * * *